(12) United States Patent
Zhang et al.

(10) Patent No.: US 11,496,175 B2
(45) Date of Patent: Nov. 8, 2022

(54) ATTACHMENT METHOD AND SYSTEM

(71) Applicant: SHANGHAI UNITED IMAGING HEALTHCARE CO., LTD., Shanghai (CN)

(72) Inventors: Lei Zhang, Shanghai (CN); Bo Zhang, Shanghai (CN); Jianhui Cao, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 429 days.

(21) Appl. No.: 16/236,594

(22) Filed: Dec. 30, 2018

(65) Prior Publication Data

US 2019/0207638 A1 Jul. 4, 2019

Related U.S. Application Data

(63) Continuation of application No. PCT/CN2017/120284, filed on Dec. 29, 2017.

(51) Int. Cl.
| | |
|---|---|
| *H04B 1/3877* | (2015.01) |
| *H01F 7/02* | (2006.01) |
| *H04M 1/04* | (2006.01) |
| *H01F 7/04* | (2006.01) |
| *H01F 7/06* | (2006.01) |

(Continued)

(52) U.S. Cl.
CPC ......... *H04B 1/3877* (2013.01); *H01F 7/0252* (2013.01); *H01F 7/04* (2013.01); *H01F 7/064* (2013.01); *H01F 7/20* (2013.01); *H04M 1/04* (2013.01); *H04M 1/72454* (2021.01)

(58) Field of Classification Search
CPC ....... H04B 1/3877; H01F 7/0252; H01F 7/04; H01F 7/064; H01F 7/20; H04M 1/04; H04M 1/72569
USPC ........................................................ 361/152
See application file for complete search history.

(56) References Cited

U.S. PATENT DOCUMENTS

2009/0174686 A1* 7/2009 Jeon ...................... G09G 3/3406
 345/174
2011/0242051 A1* 10/2011 Philipp ................. G06F 1/3262
 345/174

(Continued)

FOREIGN PATENT DOCUMENTS

| CN | 1375382 A | 10/2002 |
|---|---|---|
| CN | 104238647 A | 12/2014 |

OTHER PUBLICATIONS

Machine Translation of Zhang Chinese Patent Document CN 104238647 A Dec. 24, 2014 (Year: 2014).*

(Continued)

*Primary Examiner* — Kevin J Comber
(74) *Attorney, Agent, or Firm* — Metis IP LLC

(57) ABSTRACT

A mobile device capable of being magnetically attached to a surface may include a first attachment module. The first attachment module may be configured to generate a first magnetic field causing the mobile device to be magnetically attached to the surface. The first attachment module, in response to a pick-up signal corresponding to a detected first operation of a user to pick up the mobile device, may perform at least one of reducing a strength of the first magnetic field or reversing a polarity of the first magnetic field.

11 Claims, 12 Drawing Sheets

(51) Int. Cl.
*H01F 7/20* (2006.01)
*H04M 1/72454* (2021.01)

(56) References Cited

U.S. PATENT DOCUMENTS

| | | | | |
|---|---|---|---|---|
| 2013/0107445 | A1* | 5/2013 | Reber | G06F 1/1632 |
| | | | | 361/679.41 |
| 2013/0210365 | A1 | 8/2013 | Karuppiah et al. | |
| 2015/0181629 | A1* | 6/2015 | Jun | A61B 8/464 |
| | | | | 455/420 |
| 2015/0268699 | A1* | 9/2015 | Bathiche | G06F 1/1632 |
| | | | | 345/1.3 |
| 2016/0284497 | A1* | 9/2016 | Stryker | H03K 17/96 |
| 2017/0108895 | A1* | 4/2017 | Chamberlin | G06F 1/1632 |
| 2017/0271066 | A1* | 9/2017 | Wang | H01F 7/04 |
| 2018/0146499 | A1 | 5/2018 | Jun | |

OTHER PUBLICATIONS

International Search Report in PCT/CN2017/120284 dated Sep. 21, 2018, 5 pages.
Written Opinion in PCT/CN2017/120284 dated Sep. 21, 2018, 4 pages.

* cited by examiner

500

| Generating a pick-up signal corresponding to a detected first operation of a user to pick up a mobile device magnetically attached to a surface | 510 |

↓

| Receiving the pick-up signal by an attachment module producing a magnetic field causing the mobile device to be magnetically attached to the surface | 520 |

↓

| Performing, by the attachment module in response to the pick-up signal, at least one of reducing a strength of the magnetic field and reversing a polarity of the magnetic field | 530 |

↓

| Performing, by the attachment module in response to an absence of the pick-up signal after a predetermined time, at least one of increasing a strength of the magnetic field and reversing the polarity of the magnetic field | 540 |

Generating a drop-off signal corresponding to a detected second operation of a user to attach a mobile device to a surface or a detection that the mobile device is near or in contact with the surface — 610

Receiving the drop-off signal by an attachment module capable of producing a magnetic field causing the mobile device to be magnetically attached to the surface — 620

Performing, by the attachment module, at least one of increasing a strength of the magnetic field and reversing a polarity of the magnetic field in response to the drop-off signal — 630

FIG. 6

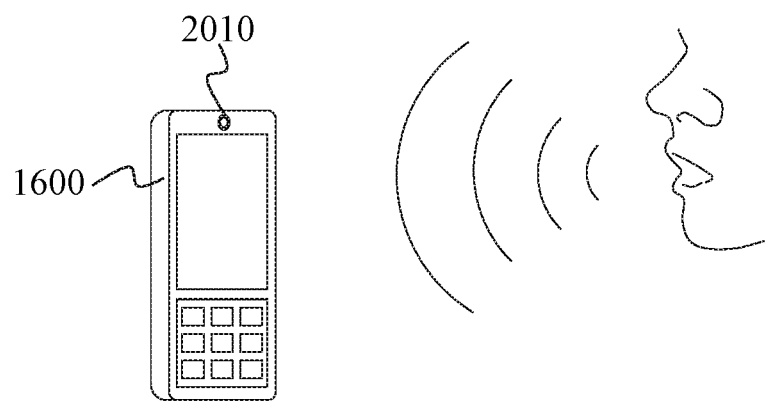
FIG. 20
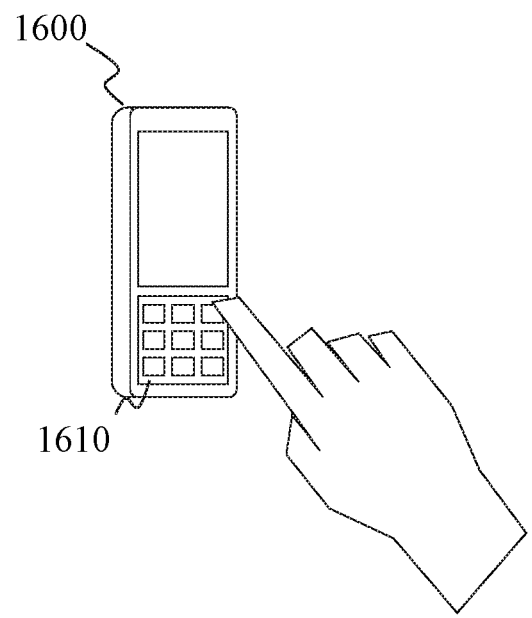 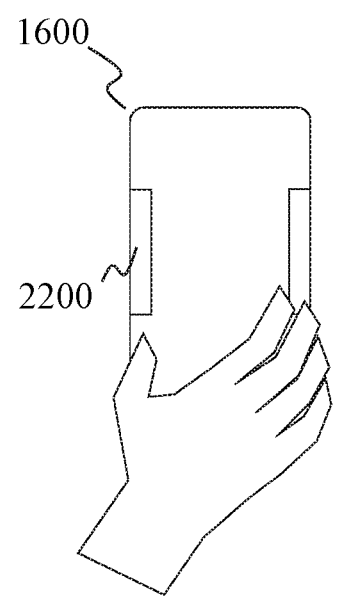
FIG. 21  FIG. 22

ATTACHMENT METHOD AND SYSTEM

CROSS REFERENCE TO RELATED APPLICATIONS

This application is a continuation of International Application No. PCT/CN2017/120284 filed on Dec. 29, 2017, the entire contents of which are incorporated herein by reference.

TECHNICAL FIELD

The present disclosure generally relates to a technical field of a magnetic attachment of a mobile device, and more particularly to a system and method for magnetically attaching or detaching a mobile device based on a detected operation of a user.

BACKGROUND

Recent advances in portable computing allow a remote control of host device by a mobile device. Magnetic attachment mechanisms (e.g., a permanent magnet, an electromagnet) have been adopted in such a control system to facilitate a user's fetching and placing of the mobile device, aiming at preventing the loss of the mobile device as well as improving the user's experience. However, most of the magnetic attachment mechanisms in the art may only produce a magnetic field of fixed strength, causing an invariable attractive force.

SUMMARY

According to an aspect of the present disclosure, a mobile device capable of being magnetically attached to a surface may include a first attachment module. The first attachment module may be configured to generate a first magnetic field causing the mobile device to be magnetically attached to the surface. The first attachment module, in response to a pick-up signal corresponding to a detected first operation of a user to pick up the mobile device, may perform at least one of reducing a strength of the first magnetic field or reversing a polarity of the first magnetic field.

In some embodiments, the first attachment module may include a first attachment mechanism and a control circuit. The first attachment mechanism may be configured to generate the first magnetic field. The control circuit may be configured to adjust a first electric current passing through the first attachment mechanism in response to the pick-up signal to perform the at least one of the reducing the strength of the first magnetic field or the reversing the polarity of the first magnetic field.

In some embodiments, to reduce the strength of the first magnetic field, the control circuit may be configured to reduce the first electric current, change an electric path of the first electric current, or cut off the first electric current.

In some embodiments, the control circuit may be further configured to adjust a second electric current passing through the first attachment mechanism. To reduce the strength of the first magnetic field, the control circuit may be further configured to reduce the second electric current or cut off the second electric current.

In some embodiments, to reverse the polarity of the first magnetic field, the control circuit may be configured to reverse a direction of the first electric current.

In some embodiments, the attachment module may further comprise a second attachment mechanism. The attachment module may be configured to generate a second magnetic field. The control circuit may be further configured to adjust a third electric current passing through the second attachment mechanism in response to the pick-up signal to cooperate with the adjustment of the first electric current.

In some embodiments, the attachment module may further comprise a permanent magnet.

In some embodiments, the first attachment module may comprise an electromagnet, and a driving system. The electromagnet may be configured to generate the first magnetic field. The electromagnet may include a coil and a movable core. A third current may pass through the coil to generate the first magnetic field. The driving system may be configured to move the core with respect to the coils to perform the at least one of the reducing the strength of the first magnetic field or the reversing the polarity of the first magnetic field.

In some embodiments, the mobile device may further comprise a pick-up signal module. The pick-up signal module may be configured to generate the pick-up signal upon a detection of the first operation of the user.

In some embodiments, the pick-up signal module may comprise a touch mechanism. The pick-up signal module may be configured to generate the pick-up signal when the touch mechanism is touched by the user.

In some embodiments, the pick-up signal module may comprise a sensor and a logical circuit. The sensor may be configured to sense a surrounding environment of the mobile device and generate a sensing signal corresponding to the surrounding environment of the mobile device. The logical circuit may be configured to detect the first operation of the user based on the sensing signals, and generate the pick-up signal when the first operation is detected.

In some embodiments, the sensor may include at least one of a range sensor, an image sensor, and a sound sensor.

In some embodiments, the first attachment module, in response to an absence of the pick-up signal after a predetermined time, may perform at least one of increasing the strength of the first magnetic field or reversing the polarity of the first magnetic field.

In some embodiments, the first attachment module, in response to a drop-off signal corresponding to a detected second operation of the user to attach the mobile device to the surface or a detection that the mobile device is near or in contact with the surface, may perform at least one of increasing the strength of the first magnetic field or reversing the polarity of the first magnetic field.

In some embodiments, the mobile device may further comprise a drop-off signal module. The drop-off signal module may be configured to generate the drop-off signal upon a detection of the second operation or a detection that the mobile device is near or in contact with the surface.

According to an aspect of the present disclosure, an attachment system may include a host device and an aforementioned mobile device. The host device may provide the surface for the mobile device to be magnetically attached to. The mobile device may further include a first communication module and a control panel. The first communication module may be configured to communicate with a second communication module of the host device. The control panel may be configured to provide a control mechanism for the user to operate the host device.

In some embodiments, the host device may comprise a permanent magnet configured to generate a third magnetic field. The third magnetic field and the first magnetic field may have opposite polarities when the mobile device is attached to the surface.

In some embodiments, the host device may comprise a second attachment module configured to generate a fourth magnetic field. The fourth magnetic field and the first magnetic field may have opposite polarities when the mobile device is attached to the surface.

In some embodiments, the second attachment mechanism, in response to a cooperation signal, may perform at least one of reducing the strength of the fourth magnetic field or reversing the polarity of the fourth magnetic field. The cooperation signal may be the pick-up signal or generated based on the pick-up signal.

In some embodiments, the mobile device may further comprise a charging connector receivable by a charging port on the host device to be electrically connected to a power supply. The charging connector may be in contact with the charging port when the mobile device is attaching to the surface.

In some embodiments, the host device may be a medical imaging device.

According to another aspect of the present disclosure, a method for facilitating a user to operate a mobile device capable of being magnetically attached to a surface. The method may include generating a pick-up signal corresponding to a detected first operation of a user to pick up a mobile device magnetically attached to a surface. The method may also include receiving the pick-up signal by an attachment module producing a magnetic field causing the mobile device to be magnetically attached to the surface. The method may further include performing, by the attachment module in response to the pick-up signal, at least one of reducing a strength of the magnetic field and reversing a polarity of the magnetic field.

In some embodiments, the method may further include performing, by the attachment module in response to an absence of the pick-up signal after a predetermined time, at least one of increasing a strength of the magnetic field and reversing the polarity of the magnetic field.

In some embodiments, the method may further include: generating a drop-off signal corresponding to a detected second operation of the user to attach the mobile device to the surface or a detection that the mobile device is near or in contact with the surface; receiving the drop-off signal by the attachment module; and performing, by the attachment module, at least one of increasing the strength of the magnetic field and reversing the polarity of the magnetic field in response to the drop-off signal.

According yet to another aspect of the present disclosure, an attachment system may include a mobile device and a host device. The mobile device may include a first communication module; and a control panel. The control panel may be configured to provide control mechanism for a user to operate the host device. The host device may include a second communication module and an attachment module. The second communication module may be configured to communicate with the first communication module. The attachment module, may be configured to generate a magnetic field to magnetically attach the mobile device to the surface. The attachment module, in response to a pick-up signal corresponding to a detected first operation of a user to pick up the mobile device, may perform at least one of reducing a strength of the first magnetic field or reversing a polarity of the magnetic field.

According yet to another aspect of the present disclosure, a case for enabling a device having an operation panel to be magnetically attached to a surface may include a body and an attachment module. The body may define a container for receiving the device without covering the operation panel. The attachment module may be configured to generate a magnetic field causing the case to be magnetically attached to the surface. The attachment module, in response to a pick-up signal corresponding to a detected first operation of a user to pick up the mobile device, may perform at least one of reducing a strength of the first magnetic field or reversing a polarity of the magnetic field.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a schematic diagram illustrating an exemplary process for picking up a mobile device magnetically attached to a surface according to some embodiments of the present disclosure;

FIG. 6 is a schematic diagram illustrating an exemplary process for attaching a mobile device magnetically to a surface according to some embodiments of the present disclosure;

Figure 13:
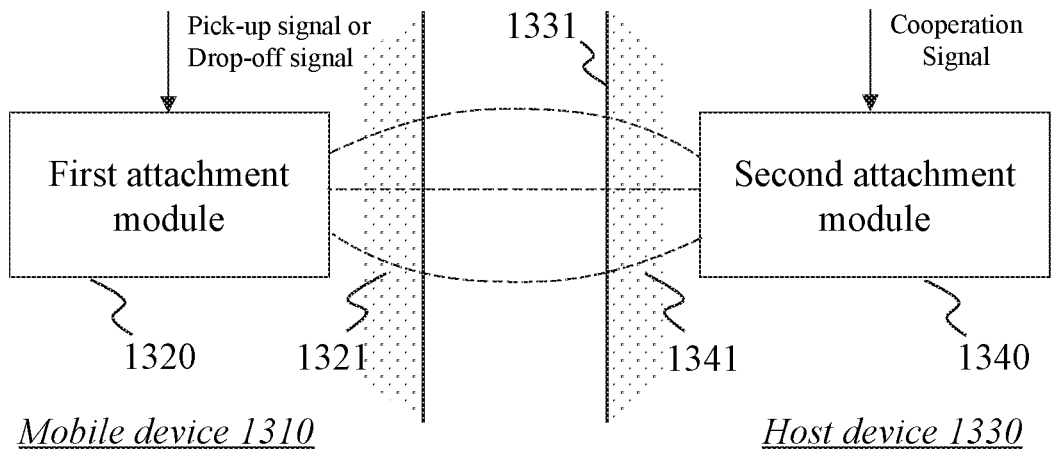
Figure 14:
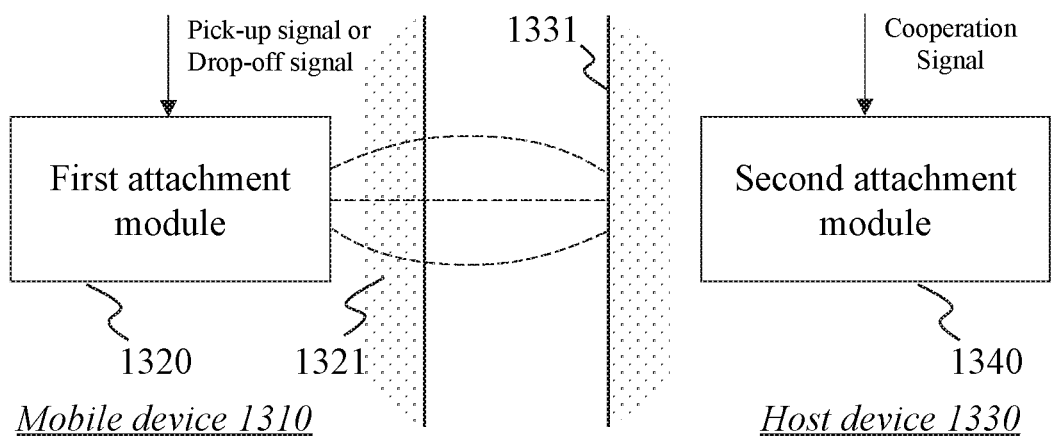
Figure 15:
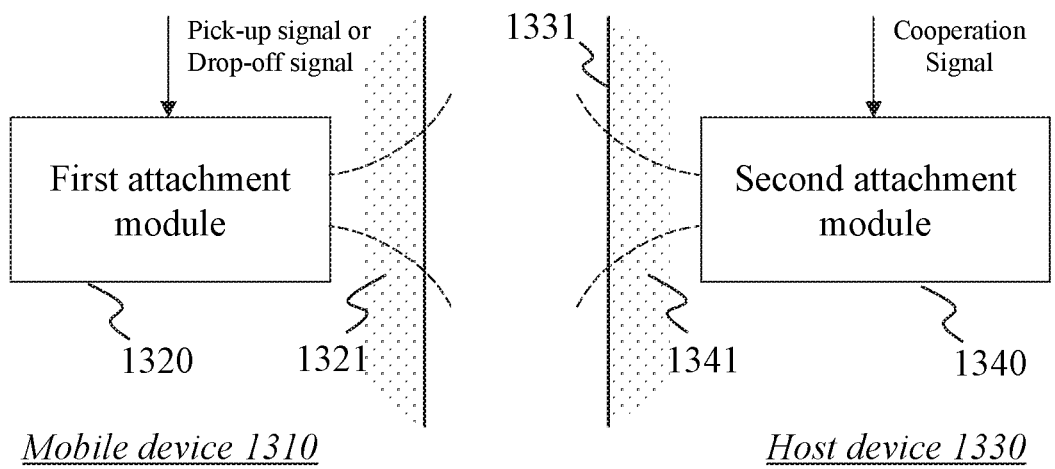
Figure 16:
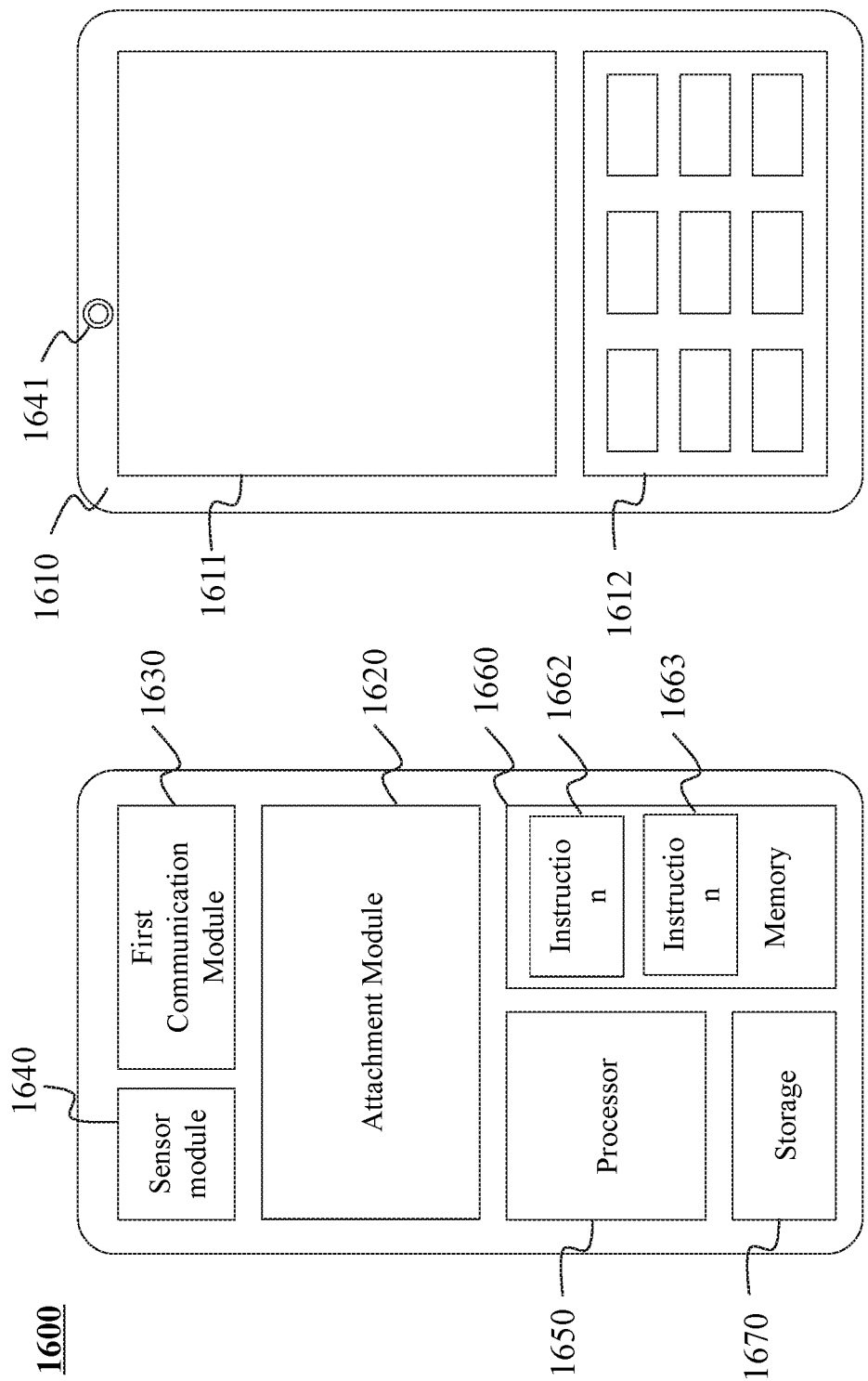

FIGS. 13, 14, and 15 are schematic diagrams illustrating exemplary interactions between a first attachment module of a mobile device and a second attachment module of a host device according to some embodiments of the present disclosure;

FIG. 16 is a schematic diagram illustrating an exemplary mobile device according to some embodiments of the present disclosure; and FIGS. 17 to 22 are schematic diagrams illustrating exemplary manners for generating pick-up signals and/or drop-off signals through the mobile device illustrated in FIG. 16 according to some embodiments of the present disclosure.

DETAILED DESCRIPTION

The present disclosure is directed to a system and method for magnetically attaching or detaching a mobile device based on a detected operation of a user. A magnetic attachment mechanism included in the mobile device may be capable of generating a magnetic field causing the mobile device to be magnetically attached to a surface. In response to a detected operation of the user, the magnetic attachment mechanism may adjust the strength and/or the polarity of the magnetic field, so as to adjust the strength and/or the property (e.g., attractive, repulsive) of the magnetic force between the mobile device and the surface.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices (e.g., processor 1650 as illustrated in FIG. 16) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logic modules/units/blocks that may be combined with other modules/units/blocks or divided into sub-modules/units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It may be noted that the term "image" used in the present disclosure generally relates to still pictures, motion pictures, videos (offline or live streaming), frames of a video, or the like, or a combination thereof. The basic unit of an image may also be generally referred to as a pixel or voxel.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure.

Figure 1:
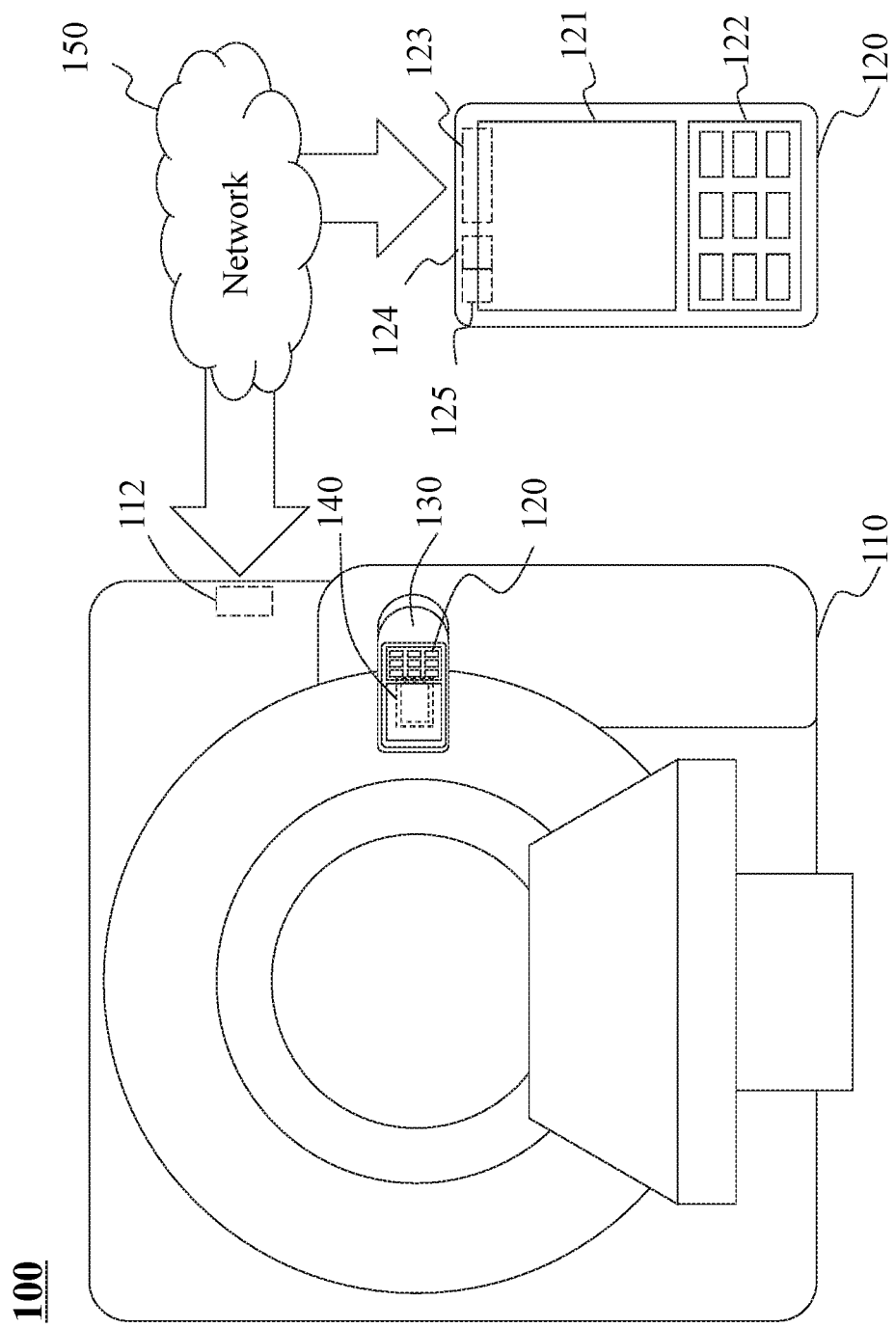
FIG. 1 is a schematic diagram illustrating an exemplary attachment system according to some embodiments of the present disclosure.

FIG. 1 is a schematic diagram illustrating an exemplary attachment system according to some embodiments of the present disclosure. Attachment system 100 may include a host device 110 and a mobile device 120.

The mobile device 120 may be magnetically attached to a surface 130 of the host device 110 via at least one attachment module 140. The at least one attachment module 140 may be configured to generate a magnetic field. With a cooperator such as a ferromagnetic substance (e.g., iron, cobalt, nickel, gadolinium, iron oxides, or the like, or an alloy thereof) or another magnetic field generator (e.g., a permanent magnet, an electric magnet) capable of generating another magnetic field of an opposite polarity, a magnetic (attractive) force may be generated between the attachment module 140 and the cooperator, causing the mobile device 120 to magnetically attach to the host device 110. The attachment module 140 may also be capable of changing the strength and/or the polarity of the magnetic field for altering the strength or property (attractive or repulsive) of the magnetic force, so that the strength of the attachment between the host device 110 and the mobile device 120 may be enhanced or weakened. For example, the attachment module 140 may include at least one electromagnet with an electric current passing through. By altering an intensity and/or a direction of the current, or turning on and off the current, the magnetic field generated by the attachment module 140 may be manipulated. Exemplary attachment modules and working mechanisms are described elsewhere in the present disclosure (e.g., FIGS. 5 to 11 and descriptions thereof).

In some embodiments, only the mobile device 120 may include an attachment module 140, and the host device 110 may include a ferromagnetic component (e.g., a ferromagnetic-material-included surface) or a permanent magnet to cooperate with the attachment module 140 for generating the magnetic force.

In some embodiments, only the host device 110 may include an attachment module 140, and the mobile device 120 may include a ferromagnetic component (e.g., a ferromagnetic-material-included surface) or a component magnet to cooperate with the first attachment module for generating the magnetic force.

In some embodiments, the mobile device 120 may include a first attachment module, and the host device 110 may include a second attachment module. The first attachment module and the second attachment module may work in cooperation to generate the magnetic force. Exemplary interaction between the first attachment module and the second attachment module is illustrated elsewhere in the present disclosure (e.g., FIGS. 12 to 14 and descriptions thereof).

For demonstration purposes, the present disclosure is described herein by way of example with reference to a mobile device 120 including an attachment module (or be referred to as a first attachment module). However, it is to be understood that the principle of the present disclosure may also be applied to a situation that only the host device 110 includes the attachment module as well.

The type and the function of the host device 110 and the mobile device 120 may vary, depending on the application field of the attachment system 100. Exemplary application fields of the attachment system 100 is described below for demonstration purposes and not intended to be limiting.

In a first exemplary application field, the host device 110 may be an appliance or equipment to be remotely controlled by the mobile device 120. The host device 110 may be immobilized. A user of the attachment system 100 may remotely control the host device 110 through a mobile device such as the mobile device 120. The attachment mechanism 140 may facilitate the user's fetching and placing of the mobile device 120. For example 110, the host device may be equipment larger in size than the mobile device 120 and provide a surface (e.g., surface 130) or place for attaching the mobile device 120 thereto. The mobile device 120 may be magnetically attached to (or mounted on) the surface 130 through the attachment module 140. The attachment module 140 may be configured so that when the mobile device 120 is attached to (or mounted on) the surface, the magnetic field generated by the attachment module 140 is strong enough (e.g., with a second intensity) to hold the mobile device 120 on the surface 130 (in some cases even when the surface 130 is vertical to the ground and/or when an accidental force is applied to the mobile device 120). The attachment module 140 may also be configured so that when the user is to fetch (or pick up) the mobile device 120, the strength of the magnetic field generated by the attachment module 140 may be reduced to a weaker intensity (e.g., a first intensity) and/or the polarity of the magnetic field may be reversed (e.g., to generate a repulsive force instead of an attractive force), allowing the user to pick up the mobile device 120 with ease.

In a second exemplary application field, the host device 110 may facilitate the operation of the mobile device 120 when the mobile device 120 is attached to the surface 130. The mobile device 120 may also be functional alone without the host device 110 for enhancing its portability. For example, the host device 110 may provide power supply, additional computing resources (e.g., additional processor, storages), additional communication means (e.g., additional ports, bandwidth), additional operation means (e.g., keyboards), or the like, or a combination thereof, for the mobile device 120. When the host device 110 is assisting the operation of the mobile device 120, an accidental separation of the mobile device 120 from the host device 110 may cause a failure in operation or even damage the devices. The attachment module 140 may be configured so that when the mobile device 120 attaches to the host device 110, the magnetic field generated by the attachment module 140 is strong enough (e.g., with the second intensity) to strengthen the attachment so that an accidental separation is avoided. The attachment module 140 may also be configured so that when the user is to use the mobile device 120 alone, the strength of the magnetic field generated by the attachment module 140 may be reduced to a weaker intensity (e.g., the first intensity) and/or the polarity of the magnetic field may be reversed, allowing the user to separate the mobile device 120 from the host device 110 with ease.

The second intensity may be higher than the first intensity. In some embodiments, the first intensity may be 0 (the generating of the magnetic field is stopped). The second intensity and/or the first intensity may be configurable or changeable (e.g., through the mobile device 120 or the host device 110) to accommodate the user's need. Alternatively, the second intensity and/or the first intensity may be unchangeable.

For demonstration purposes, the present disclosure may be described herein with reference to the first exemplary application field. However, it is to be understood that the principle of the present disclosure may also be applied to the second exemplary application field and any other application field as well. For example, the host device 110 may be a vehicle, a lathe, a printer, a scanner (e.g., which may be potentially health risky), a server, a charger, a television, a dock (e.g., laptop used), a speaker, a keyboard, or the like, or a combination thereof. In an exemplary embodiment, the host device 110 may be a medical imaging device, such as a computed tomography (CT) device, digital radiography (DR) device, a positron emission tomography (PET) device, PET-CT, radiotherapy equipment (RT); or the like, or a combination thereof. Moreover, the mobile device 120 may be a controller for facilitating a nurse or a technician to operate on the imaging device.

In some embodiments, when the mobile device 120 is attached to (or mounted on) the surface 130, the host device 110 may charge the mobile device 120. For example, the mobile device 120 may include a charging connector receivable by a charging port on the host device 110 to be electrically connected to a power supply. When the mobile device 120 is attaching to the surface 130, the charging connector may be in contact with the charging port, causing the mobile device 120 to be charged. As another example, when the mobile device 120 is attaching to the host device 110, a sensing mechanism and/or a touch mechanism on the mobile device 120 or the host device 110 may be triggered, causing the host device 110 to wirelessly charge the mobile device 120.

The attachment module 140 may respond to a pick-up signal corresponding to a detected operation of a user to pick-up the mobile device 120 from the surface 130 (first operation). In response to the pick-up signal, the attachment module 140 may reduce the strength of the magnetic field from the second intensity to the first intensity to weaken the magnetic force. Alternatively or additionally, the attachment module 140 may reverse the polarity of the magnetic field.

The pick-up signal may be generated by a pick-up signal module 124 of the attachment system 100. The pick-up signal module 124 may detect the first operation of the user and generate the pick-up signal when the first operation is detected. The pick-up signal module 124 may be included either in the host device 110 or the mobile device 120. The pick-up signal module 124 and the attachment module 140 may be included in the same device or different devices. For example, the pick-up signal module 124 may be on the mobile device 120 and the attachment module 140 may be on the host device 110. The pick-up signal may be transmitted from the mobile device 120 to the host device 110. Vice versa. For demonstration purposes, the pick-up signal module 124 is illustrated as included in the mobile device 120 in FIG. 1, which is not intended to be limiting.

In some embodiments, the attachment module 140 may also respond to a drop-off signal corresponding to a detected operation of a user to attach the mobile device 120 to the surface 130 (second operation) or a detection that the mobile device 120 is near or in contact with the surface 130. In response to the drop-off signal, the attachment module 140 may increase the strength of the magnetic field from the first intensity to the second intensity to strengthen the magnetic force. Alternatively or additionally, the attachment module 140 may reverse the polarity of the magnetic field, so that a repulsive magnetic force (e.g., caused by the picking-up of the mobile device 120) may become an attractive force for causing the mobile device 120 to be attached to or mounted on the surface 130.

The drop-off signal may be generated by a drop-off signal module 125 of the attachment system 100. The drop-off signal module 125 may detect the second operation of the user or whether the mobile device 120 is near or in contact with the surface 130. When the second operation, the nearness or the contact is detected, the drop-off signal module 125 may generate a drop-off signal. The drop-off signal module 125 may be included either in the host device 110 or the mobile device 120. The drop-off signal module 125 and the attachment module 140 may be included in the same device or different devices. For demonstration purposes, the drop-off signal module 125 is illustrated as included in the mobile device 120 in FIG. 1, which is not intended to be limiting.

In some embodiments, the drop-off signal module 125 may include two components (a first component and a second component), one in the mobile device 120, and the other one in the host device 110. When the mobile device 120 is attached to the surface 130, the first component (either in the mobile device 120 or the host device 110) may be in contact with the second component or sense the second component. Consequently, the first component may generate the drop-off signal, which may be transmitted to the attachment module 140.

In some embodiments, the pick-up signal module 124 and the drop-off signal module 125 may be integrated into a single module. For example, the pick-up signal module 124 and the drop-off signal module 125 may be implemented by the same sensor and the same logic circuit (e.g., a processor, a field-programmable gate array). When the logic circuit determines that a sensing signal generated by the sensor includes a detection of the first operation of the user to pick up the mobile device 120, the logical circuit may generate the pick-up signal. When the logic circuit determines that a sensing signal generated by the sensor corresponds to a detection of the second operation of the user to attach the mobile device 120 to the surface 130 or includes a detection that the mobile device 120 is near or in contact with the surface 130, the logical circuit may generate the drop-off signal.

In some embodiments, the drop-off signal module 125 may be integrated into a charging mechanism of the mobile device 120. When the mobile device 120 is attached to the surface 130, the host device 110 may charge the mobile device 120, and the drop-off signal may be generated simultaneously. For example, the drop-off signal module 125 may be implemented by the charging connector of the mobile device 120 and/or the charging port on the host device 110. As another example, the drop-off signal module 125 may be implemented by the sensing mechanism and/or touch mechanism for triggering the wireless charging of the mobile device 120.

The pick-up signal and/or the drop-off signal may be generated in various manners. Exemplary pick-up signal and drop-off signal generation manners are described elsewhere in the present disclosure (e.g. FIGS. 16 to 21 and descriptions thereof).

In some embodiments, the drop-off signal module 125 may be omitted from the attachment system 100. For example, the attachment module 140 may respond to the absence of a pick-up signal. In response to the absence of a pick-up signal, the attachment module 140 may increase the strength of the magnetic field to the second intensity and/or reverse the polarity of the magnetic field. After that, the attachment module 140 may maintain the strength and the polarity of the magnetic field unless the pick-up signal is received.

In some embodiments, the attachment module 140 included in the mobile device 120 may be powered by the host device 110. When the mobile device 120 is attaching to the surface 130, the attachment module 140 may be powered by the host device 110, and the magnetic field may be generated by producing an attractive magnetic force. When the mobile device 120 is separated from the surface 130, the electric current passing through the attachment module 140 may be cut off, and the magnetic field may also be turned off. The electric current for generating the magnetic field may also function as the cut-off signal.

In some embodiments, the mobile device 120 may include a control panel to provide a control mechanism for the user to operate the host device 110. The control panel may include at least one or a screen 121 and a keypad 122. The screen 121 may be a touchscreen. The keypad 122 may include one or more operation keys or buttons for operating the mobile device 120 and/or the host device 110. The keypad 122 may be a physical keypad or a virtual keypad displayed by the screen 121. In some embodiments, the mobile device 120 may include storage, for storing instructions, and at least one processor. The at least one processor, when executing the instructions, may provide a user interface (UI) through the screen 121 to the user. The user may operate on the UI through the screen 121 and/or the keypad 122 to control the mobile device 120 and/or the host device 110.

The control mechanism may generate operation signals in response to an operation of the user. The operation signals may be transmitted to the host device 110, causing the host device 110 to perform a corresponding operation.

The mobile device 120 may include a first communication module 123, and the host device 110 may include a second communication module 112. The first communication module 123 may be configured to communicate with the second communication module 112 through one cable and/or a network 150. For example, the pick-up signal, the drop-off signal, and the operation signals may be transmitted between the host device 110 and the mobile device 120 through the first communication module 123 and the second communication module 112.

The network 150 may include any suitable network that can facilitate the exchange of information and/or data between the host device 110 and the mobile device 120. Merely by way of example, the network 150 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. In some embodiments, the network 150 may be a Wi-Fi network including at least one wireless router. Alternatively or additionally, the network 150 may be a Bluetooth™ network.

In some embodiments, in addition to communicate with each other through the network 150, the first communication module 123 and the second communication module 112 may also be configured to communicate through at least one electric path formed between the host device 110 and the mobile device 120 when the mobile device 120 is attaching to the surface 130 in order to save powers.

It should be noted that the above description about the attachment system 100 is only for illustration purposes, and is not intended to limit the present disclosure. It is understandable that, after learning the major concept and the mechanism of the present disclosure, a person of ordinary skill in the art may alter attachment system 100 in an uncreative manner. The alteration may include combining and/or splitting modules or sub-modules, adding or removing optional modules or sub-modules, etc. All such modifications are within the protection scope of the present disclosure. For example, the attachment module 140 may be included in a case for enabling the mobile device 120 to be magnetically attached to a ferromagnetic-substance-included surface or a surface adjacent to a magnetic field source (e.g., the surface 130). The case may have a body defining a container for receiving the mobile device 120 without covering the operation panel. The attachment module 140 may be powered by a battery of the case, the mobile device 120, and/or the host device 110.

Figure 2:
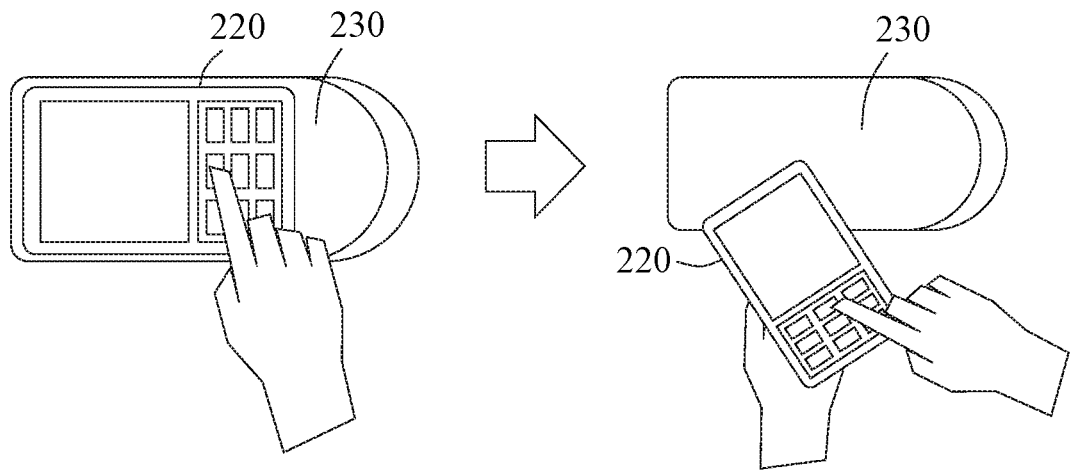
FIG. 2 is a schematic diagram illustrating an exemplary mobile device and host device according to some embodiments of the present disclosure.
Figure 3:
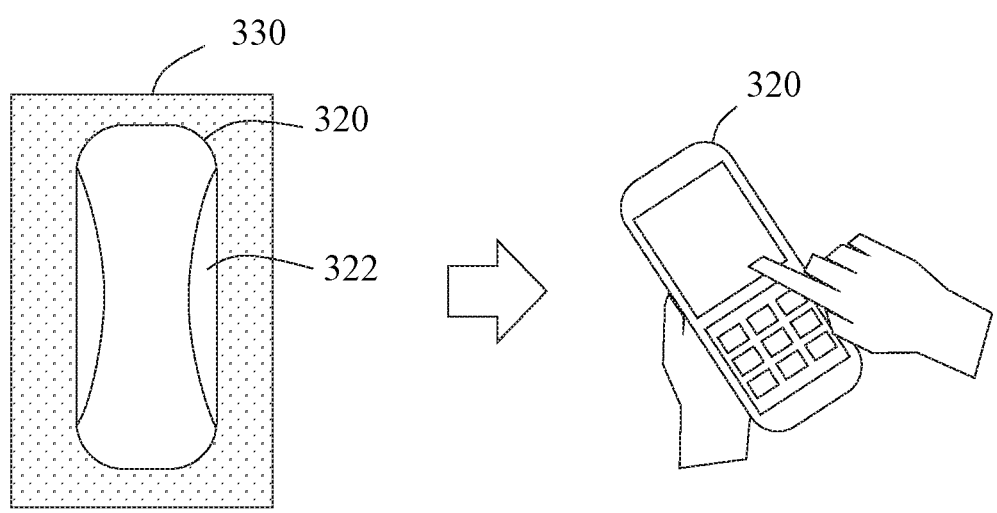
FIG. 3 is a schematic diagram illustrating an exemplary mobile device and host device according to some embodiments of the present disclosure.

FIGS. 2 and 3 are schematic diagrams illustrating exemplary mobile devices and host devices according to some embodiments of the present disclosure. The examples illustrated in FIGS. 2 and 3 are only for demonstration purposes and not intended to be limiting.

As illustrated in FIG. 2, the mobile device 220 and the surface 230 may be exemplary embodiments of the mobile device 120 and the surface 130, respectively. The surface 230 may be provided by, for example, the host device 110. When the mobile device 220 is attached to the surface 230, at least a part of a control panel of the mobile device 220 may be exposed, so that a user may operate the mobile device 220 and/or the host device 110 when the mobile device 220 is attached to the surface 230. The control panel may be rotated or not rotated after a user picks up the mobile device 220 from the surface 230.

As illustrated in FIG. 3, the mobile device 320 and the surface 330 may be exemplary embodiments of the mobile device 120 and the surface 130, respectively. The surface 330 may be provided by, for example, the host device 110. When the mobile device 320 is attached to the surface 330, at least a part of the control panel of the mobile device 320 may face the surface 330, and a user may not operate or fully operate the mobile device 320 and/or the host device 110 when the mobile device 320 is attached to the surface 330. However, the mobile device 320 may provide one or more structures (e.g., ergonomic structures) 322 to facilitate the user to pick-up the mobile device 320. In some embodiments, the one or more structures 322 may be involved in generating the pick-up signal. For example, one or more pressure sensors (may also be referred to as a touch mechanism) may be integrated into to the one or more structures 322. So that when the user picks up the mobile device 320, one or more pressure sensors may be touched by the user, and a pick-up signal may be generated based at least on the signal(s) generated by the pressure sensor(s). In some embodiments, the signals generated by the one or more pressure sensors may also be directly used as the pick-up signal(s)).

The attachment manners illustrated in FIGS. 2 and 3 are not teaching away from each other. For example, the mobile device 220 and/or the surface 230 may also provide one or more structures to facilitate the user to pick-up the mobile device 220. The mobile device 320 may also include a simplified control panel that is exposed when the mobile device 320 is attaching to the surface 330.

In some embodiments, the surface 230 or 330 may be a certain surface specifically for attaching the mobile device 220 or 320. For example, the surface 230 or 330 may include charging port and/or communication port for charging or communicating with the mobile device 220 or 320. Alternatively, the surface 230 or 330 may be an arbitrary surface of the host device 110. For example, the host device may have a housing including ferromagnetic-substance. The mobile device 220 or 320 may be attached to any part of the housing.

Figure 4:
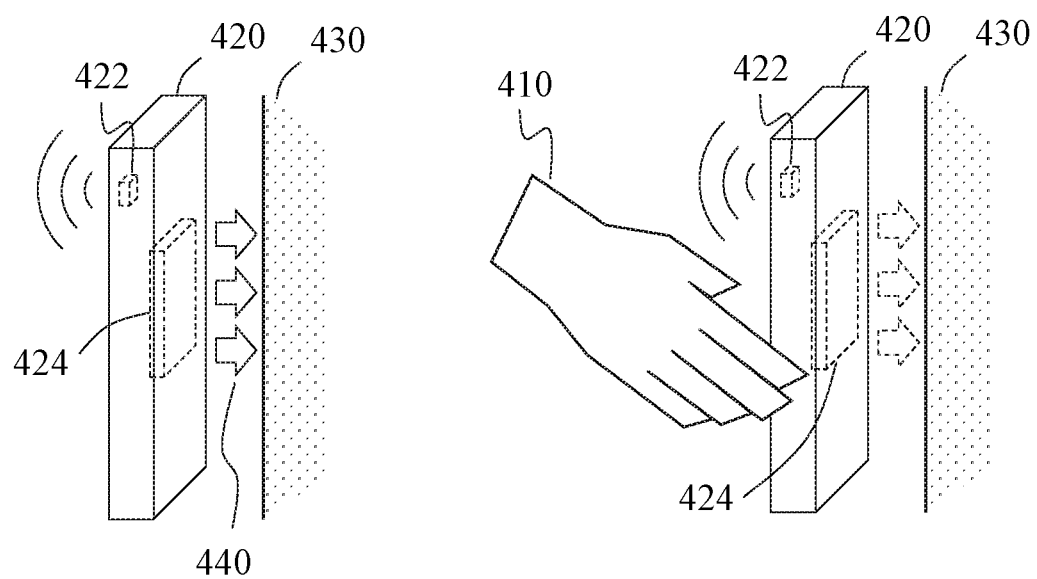
FIG. 4 is a schematic diagram illustrating an exemplary mobile device and host device according to some embodiments of the present disclosure.

FIG. 4 is a schematic diagram illustrating an exemplary mobile device and host device according to some embodiments of the present disclosure. Mobile device 420 may be an exemplary embodiment of the mobile device 120. The mobile device 420 may include an attachment module 424 and a pick-up signal module 124 (not shown in FIG. 4). The attachment module 424 is an exemplary embodiment of the attachment module 140. Through the attachment module 424, the mobile device 420 may be attached to a surface 430, which is an exemplary embodiment of the surface 130.

When the mobile device 420 is attached to the surface 430, the attachment module 424 may generate a magnetic field having the strength with a second intensity. With a cooperator such as a ferromagnetic substance or another magnetic field generator included by or near the surface 430, an attractive magnetic force 440 may be produced between the attachment module 424 and the surface 430, causing the mobile device 420 to be attached to the surface 430.

The pick-up signal module 124 may be configured to generate a pick-up signal upon a detection of a first operation of a user 410 to pick up the mobile device 420 from the surface 430. For example, the pick-up signal module 124 may include a sensor 422 (e.g., a range sensor, an image sensor) for monitoring a presence of the user 410 within a monitoring region (which may be set close to the mobile device 420). The presence of the user 410 within the monitoring region may be an exemplary first operation to pick-up the mobile device. Other exemplary detection mechanisms are provided elsewhere in the present disclosure (e.g., FIGS. 16 to 21 and the descriptions thereof). In response to a detection of the first operation, the pick-up signal module 124 may generate the pick-up signal, causing the strength of the magnetic field generated by the attachment module 424 to be reduced to a first intensity, which may be smaller to the second intensity. In some embodiments, the first intensity may be 0. Consequently, the attractive magnetic force 440 may have a reduced strength or be turned off, and the user 410 may pick up the mobile device 420 with ease. Alternatively or additionally, the attachment module 424 may reverse the polarity of the magnetic field, and the attractive magnetic force 440 may become a repulsive magnetic force.

FIG. 5 is a schematic diagram illustrating an exemplary process for picking up a mobile device magnetically attached to a surface according to some embodiments of the present disclosure. One or more operations of process 500 may be implemented in the attachment system illustrated in FIG. 1.

In 510, the pick-up signal module 124 may generate a pick-up signal corresponding to a detected first operation of a user to pick up a mobile device 120 magnetically attached to a surface 130. The surface 130 may belong to a host device 110. The pick-up signal module 124 may be included in the mobile device 120 or the host device 110.

In some embodiments, the pick-up signal module 124 may include a touch mechanism. The pick-up signal module 124 may generate the pick-up signal when the touch mechanism is touched by the user (an exemplary first operation). For example, the touch mechanism may include one or more pressure sensor for sensing the user touches a specific area of the mobile device 120 or the host device 110. As another example, the touch mechanism may include one or more keys or buttons on the keypad 122. Detailed descriptions of the touch mechanism are provided elsewhere in the present disclosure (e.g., FIGS. 21 and 22, and the descriptions thereof).

In some embodiments, the pick-up signal module 124 may include a sensing mechanism. For example, the pick-up signal module 124 may include one or more sensors configured to sense a surrounding environment of the mobile device 120 and generate a sensing signal corresponding to the surrounding environment of the mobile device 120. The pick-up signal module 124 may further include a logic circuit configured to detect the first operation of the user based on the sensing signals. The pick-up signal module 124 may generate the pick-up signal when the first operation is detected. The one or more sensors may include a range sensor, an image sensor, a sound sensor, or the like, or a combination thereof. Detailed descriptions of the touch mechanism are provided elsewhere in the present disclosure (e.g., FIGS. 21 and 22 and the descriptions thereof).

In some embodiments, the pick-up signal module 124 may generate the pick-up signal when a plurality of mechanisms are triggered. For example, the pick-up signal module 124 may generate the pick-up signal when a touch mechanism and a sensing mechanism included are both triggered. As another example, the pick-up signal module 124 may generate the pick-up signal when a plurality of sensing mechanisms are triggered. In some embodiments, the pick-up signal module 124 may further include an identification mechanism (e.g., biometric identification, passwords, voice identification) to determine whether a user who is picking up the mobile device 120 is an authorized user. The pick-up signal module 124 may generate the pick-up signal further based on the identification result.

In some embodiments, the pick-up signal module 124 may only generate the pick-up signal when the mobile device 120 attaches to the surface 130. Determination mechanism for determining whether the mobile device 120 attaches to the surface 130 may include one or more sensors (e.g., pressure sensors), connectors, and ports that receive the connectors, or the like, or a combination thereof. The determination mechanism may be included in the mobile device 120 and/or the host device 110. Alternatively, the pick-up signal module 124 may keep generating the pick-up signal as long as one or more of the touch mechanism(s), sensing mechanisms(s), and the identification mechanisms(s) are triggered.

The pick-up signal generated by the pick-up signal module 124 may be transmitted to the attachment module 140.

In 520, the attachment module 140 may receive the pick-up signal. The attachment module may produce a magnetic field causing the mobile device 120 to be magnetically attached to the surface 130. The attachment module 140 may be included in the mobile device 120 or the host device 110. In some embodiments, the mobile device 120 may include a first attachment module and the host device 110 may include a second attachment module (e.g., as illustrated in FIGS. 13 to 15).

In some embodiments, the attachment module 140 and the pick-up signal module 124 may be included in the same device. For example, the pick-up signal module 124 and the attachment module 140 may be both included in the mobile device 120. The attachment module 140 may receive the pick-up signal from the pick-up signal module 124 through an electric path. In some embodiments, the pick-up signal may be transmitted through a bus.

In some embodiments, the attachment module 140 and the pick-up signal module 124 may be included in different devices. For example, the pick-up signal module 124 may be included in the mobile device 120 and the attachment module 140 may be included in the host device 110. The attachment module 140 may receive the pick-up signal via a first communication module 123 of the mobile device 120 and a second communication module 112 of the host device 110. In some embodiments, the pick-up signal may be transmitted wirelessly (e.g., through the network 150).

In some embodiments, the mobile device 120 may include a first attachment module, and the host device 110 may include a second attachment module. The pick-up signal module 124 may be included in the mobile device 120 or the host device 110. For demonstration purposes, the pick-up signal module 124 may be described as included in the mobile device 120, which is not intended to be limiting.

The pick-up signal module 124 may generate a first signal to be transmitted to the first attachment module and a second signal to be transmitted to the host device 110. The first signal and the second signal may be same or different. The first attachment module may receive the first signal, and the second attachment module may receive a first cooperation signal. The first cooperation signal may be the second signal transmitted through the first communication module 123 and the second communication module 112. Alternatively, the first cooperation signal may be generated by a logic circuit of the host device 110 upon receiving the second signal through the first communication module 123 and the second communication module 112. For simplicity, the first signal and the second signal may both be referred to as a pick-up signal.

In 530, the attachment module 140 may perform at least one of reducing a strength of the magnetic field and reversing a polarity of the magnetic field in response to the pick-up signal. By reducing the strength of the magnetic field and/or reversing the polarity of the magnetic field (if a cooperator at or near the surface 130 involved in the attachment of the mobile device 120 is also a magnetic field generator), the magnetic force formed between the host device 110 and the mobile device 120 may be reduced and/or become a repulsive force from an attractive force. Therefore, the user may pick up the mobile device 120 from the surface 130 with ease.

In some embodiments, the attachment module 140 may be capable of adjusting the strength of the magnetic field. The attachment module 140 may be capable of changing the strength of the magnetic field from a second intensity to a first intensity. The first intensity may be smaller than the second intensity. By changing the strength of the magnetic field from the second intensity to the first intensity, the magnetic force formed between the host device 110 and the mobile device 120 may be decreased. For example, the first intensity may be 0%, 10%, 20%, 25%, 50%, etc., of the second intensity. In some embodiments, the first intensity and/or the second intensity may be configurable via, for example, the mobile device 120, to accommodate to the user's operation experience.

In some embodiments, the first intensity may be 0 or too small to hold the mobile device 120 or the surface 130, or the attachment module 140 is to reverse the polarity of the magnetic field to respond to the pick-up signal. To prevent the mobile device 120 from being damaged due to a sudden disappearance of the magnetic force, the pick-up signal may be generated when the user is holding the mobile device 120. For example, the pick-up signal may be generated by the pick-up signal module 124 based at least on a detection that the user is holding the mobile device 120 (e.g., through one or more touch mechanism). Alternatively or additionally, in response to the pick-up signal, the attachment module 140 may reduce the strength of the magnetic field in a predetermined speed or according to a predetermined scheme (e.g., in a form of a function) to give the user enough time to hold the mobile device 120. Alternatively or additionally, the mobile device 120 may warn the user through, for example, the UI (e.g., a dialog box), sound (e.g., beep, voice), indicator light (e.g., LED), etc., before reducing the strength of the magnetic field or reversing the polarity of the magnetic field.

In some embodiments, the mobile device 120 may include a first attachment module, and the host device 110 may include a second attachment module. Upon receiving the pick-up signal and the cooperation signal, the first attachment module and the second attachment module may work in cooperation to reduce a magnetic force between the mobile device 120 and the host device 110 and/or change the magnetic force from an attractive force to a repulsive force. Related descriptions are provided elsewhere in the present disclosure (e.g., FIGS. 12 to 14 and the descriptions thereof).

After the mobile device 120 is picked up by the user, the attachment module 140 may maintain the strength of the magnetic field (the first strength) and/or the reversed polarity. Alternatively, the attachment module 140 may turn off the magnetic field when the first strength is not 0. For example, the attachment module 140 may turn off the magnetic field after a predetermined time period since the decrease of the strength of the magnetic field to the first strength. As another example, the attachment module 140 may reduce the strength of the magnetic field according to a predetermined scheme (e.g., in the form of a function) so that the strength of the magnetic field may be reduced to 0 after the user picks up the mobile. As a further example, the attachment module 140 may turn off the magnetic field in response to a detection of the user holding the mobile device 120 (e.g., through one or more touch mechanisms of the mobile device 120).

The structure of the attachment module 140 may vary. For attachment modules 140 having different structures, different techniques may be adopted to reduce the strength and/or reverse the polarity. Exemplary embodiments of the attachment module 140 and corresponding working mechanisms are described elsewhere in the present disclosure (e.g., FIGS. 7 to 12 and descriptions thereof).

In 540, the attachment module 140 may perform at least one of increasing a strength of the magnetic field and reversing a polarity of the magnetic field in response to the absence of a pick-up signal after a predetermined time period. Operation 540 may be performed to allow the user to attach the mobile device 120 to the surface 130 with a predetermined strength (corresponding to the second intensity). Alternatively or additionally, operation 540 may also be performed to ensure that the mobile device 120 is not damaged when the process of the user's picking up of the mobile device 120 is interrupted or aborted. In some embodiments, operation 540 may be omitted from process 500, and another process (e.g., process 600 illustrated in FIG. 6) may be performed to allow the user to attach the mobile device 120 to the surface 130 and/or secure the mobile device 120 from the aborted picking-up process.

In some embodiments, operation 540 may be performed to allow the user to attach the mobile device 120 to the surface 130. In some embodiments, after the user picks up the mobile device 120, the generation of the pick-up signal may be aborted. After the predetermined time period, the attachment module 140 may increase the strength of the magnetic field and/or reverse the polarity of the magnetic field (if the polarity of the magnetic field has been reversed and maintained during the pick-up process) so that the mobile device 120 is ready to be attached to the surface 130 (or another surface) again. In some embodiments, the predetermined time period may be based on an average or minimal separation time period of the mobile device 120 from the surface 130. Alternatively or additionally, the predetermined time period may be set by the user, for example, through the mobile device 120. Alternatively, the predetermined time period may be non-configurable.

In some embodiments, the pick-up signal may be an instant signal and may disappear even before the user picks up the mobile device 120 from the surface 130. The predetermined time period may also be set to give the user enough time to pick up the mobile device 120.

In some embodiments, when the user is holding the mobile device 120, the pick-up signal module 124 may keep generating pick-up signals. For example, the pick-up signals may be generated based at least on the detection of the user's holding or touching the mobile device 120. The predetermined time period may be set with a small value (e.g., 0 or any other proper value), so that as soon as the user releases the mobile device 120, the strength of the magnetic field may be increased to hold the mobile device 120 on the surface 130. A small attractive force may be needed between the mobile device 120 and the surface 130 before the user releases the mobile device 120 to secure the mobile device 120. For example, the first intensity may not be set as 0, and the polarity of the magnetic field may not be reserved for the picking-up of the mobile device 120. In some embodiments, the attachment module 140 may increase the strength of the magnetic field based further on a detection that the mobile device 120 is in contact with or near the surface 130.

In some embodiments, operation 540 may be performed to secure the mobile device 120 to ensure that the mobile device 120 is not damaged when the process of the user's picking up of the mobile device 120 is interrupted or aborted. When the pick-up signal is absent for the predetermined time period (e.g., 0 or any other proper value), and the decreasing of the strength of the magnetic field has already started or performed, the attachment module 140 may increase the strength of the magnetic field (e.g., to the second intensity), so that the mobile device 120 may not be dropped by accident. In some embodiments, the attachment module 140 may increase the strength of the magnetic field based further on a detection that the mobile device 120 is in contact with the surface 130.

It may be noted that the above descriptions of the picking-up the mobile device 120 from the surface 130 are only for demonstration purposes and not intended to be limiting. It is to be understood that, after learning the major concept and the mechanism of the present disclosure, a person of ordinary skill in the art may alter process 500 in an uncreative manner. For example, one or more optional operations may be added to or removed from process 500. One or more operations may be divided or be combined. All such modifications are within the protection scope of the present disclosure.

FIG. 6 is a schematic diagram illustrating an exemplary process for attaching a mobile device magnetically to a surface according to some embodiments of the present disclosure. One or more operations of process 600 may be implemented in the attachment system illustrated in FIG. 1.

Process 600 may be performed to allow the user to attach the mobile device 120 to the surface 130 again. Alternatively or additionally, process 600 may also be performed to ensure that the mobile device 120 is not damaged when the process of the user picking up the mobile device 120 is interrupted or aborted.

In 610, the drop-off signal module 125 may generate a drop-off signal corresponding to a detected second operation of a user to attach a mobile device 120 magnetically to a surface 130 or a detection that the mobile device 120 is near or in contact with the surface 130. The surface 130 may belong to a host device 110. The drop-off signal module 125 may be included in the mobile device 120 or the host device 110.

In some embodiments, the drop-off signal may be generated when the user attaches the mobile device 120 to the surface 130. In some embodiments, the drop-off signal module 125 may generate the drop-off signal based at least on a detected second operation. The drop-off signal module 125 may detect the second operation in a manner similar to the pick-up signal module 124 detecting the first operation. For example, the drop-off signal module 125 may also detect the second operation through one or more touch mechanism(s) and/or sensing mechanisms. Detailed descriptions of the touch mechanism(s) and sensing mechanism are provided elsewhere in the present disclosure (e.g., FIGS. 16 to 19 and the descriptions thereof)

In some embodiments, the drop-off signal module 125 may generate the drop-off signal based at least on a detection that the mobile device 120 is near or in contact with the surface 130. For example, the mobile device 120 and/or the surface 130 may include a touch mechanism (e.g., one or more pressure sensors, buttons) which may be triggered when the mobile device 120 is in contact with the surface 130. As another example, the mobile device 120 and/or the surface 130 may include a sensing mechanism (e.g., an NFC sensor, a magnetic field sensor) which may be triggered when the mobile device 120 is near or in contact with the surface 130.

In some embodiments, the drop-off signal module 125 may include two components (a first component and a second component), one in the mobile device 120, and the other one in the host device 110. When the mobile device 120 is attached to the surface 130, the first component (either in the mobile device 120 or the host device 110) may be in contact with the second component or sense the second component. Consequently, the first component may generate the drop-off signal, which may be transmitted to the attachment module 140. In some embodiments, the first component may be a connector and the second component may be a port for receiving the first component. The connector and the port may also be used for transmitting data and/or power supply.

For not interfering with the generation of the pick-up signal, the generation of the pick-up signal or the picking up process may have a higher priority than the generation of the drop-off signal based on the contactness or closeness. Alternatively, additional conditions may also be met for generating the drop-off signal. For example, the trigger of the touching or sensing mechanism for determining the contact or the nearness may also need that mobile device 120 is not near or in contact with the surface 130 before the nearness or contact is detected.

In some embodiments, the drop-off signal module 125 may generate the drop-off signal based on both the detected second operation of the user to attach the mobile device 120 is and the detection that the mobile device 120 is near or in contact with the surface 130.

In some embodiments, the drop-off signal may be generated when the picking-up the mobile device 120 is interrupted or aborted. For example, when the decreasing of the strength of the magnetic field has already started or performed, and the mobile device 120 is still in contact with the surface 130, the attachment module 140 may increase the strength of the magnetic field (e.g., to the second intensity) upon receiving a drop-off signal, so that the mobile device 120 may not be dropped by accident. The drop-off signal may be generated based on a detection that, for example, the user is not touching the mobile device 120 (e.g., through one or more touch mechanisms) and/or the user is out of a sensing range (e.g., through one or more sensing mechanisms) when the picking-up process has already been started.

The drop-off signal generated by the drop-off signal module 125 may be transmitted to the attachment module 140.

In 620, the attachment module 140 may receive the drop-off signal. The attachment module 140 receiving the drop-off signal may be similar to the attachment module 140 receiving the pick-up signal.

In some embodiments, the mobile device 120 may include a first attachment module and the host device 110 may include a second attachment module (e.g., as illustrated in FIGS. 13 to 15). The drop-off signal module 125, for example, included in the mobile device 120, may generate a third signal to be transmitted to the first attachment module and a fourth signal to be transmitted to the host device 110. The third signal and the fourth signal may be the same or different. The first attachment module may receive the third signal, and the second attachment module may receive a second cooperation signal. The second cooperation signal may be the fourth signal transmitted through the first communication module 123 and the second communication module 112. Alternatively, the second cooperation signal may be generated by a logic circuit of the host device 110 upon receiving the fourth signal through the first communication module 123 and the second communication module 112. For simplicity, the third signal and the fourth signal may both be referred to as a drop-off signal.

In 630, the attachment module 140 may perform at least one of increasing a strength of the magnetic field and reversing a polarity of the magnetic field in response to the drop-off signal. By increasing the strength of the magnetic field and/or reversing the polarity (if the polarity of the magnetic field has been reversed and maintained during the picking up process) of the magnetic field, the magnetic force formed between the host device 110 and the mobile device 120 may be increased and/or become an attractive force from a repulsive force. The mobile device 120 may be attached to the surface 130 with a predetermined strength (corresponding to the second intensity).

In some embodiments, the mobile device 120 may include a first attachment module, and the host device 110 may include a second attachment module. Upon receiving the drop-off signal and the cooperation signal, the first attachment module and the second attachment module may work in cooperation to enhance a magnetic force between the mobile device 120 and the host device 110 and/or change the magnetic force from a repulsive force to an attractive force. Detailed descriptions are provided elsewhere in the present disclosure (e.g., FIGS. 13 to 15 and descriptions thereof).

The structure of the attachment module 140 may vary. For attachment modules 140 having different structures, different techniques may be adopted to increase the strength and/or reverse the polarity. Exemplary embodiments of the attachment module 140 and corresponding working mechanisms are described elsewhere in the present disclosure FIGS. 7 to 11, which is only for demonstration purposes and not intended to be limiting.

It may be noted that the above descriptions of the attaching the mobile device 120 to the surface 130 are only for demonstration purposes and not intended to be limiting. It is to be understood that, after learning the major concept and the mechanism of the present disclosure, a person of ordinary skill in the art may alter process 600 in an uncreative manner. For example, one or more optional operations may be added to or removed from process 500. One or more operations may be divided or be combined. All such modifications are within the protection scope of the present disclosure.

FIGS. 7 to 12 are schematic diagrams illustrating exemplary attachment modules according to some embodiments of the present disclosure. Attachment modules 700 to 1200 may be embodiments of the attachment module 140, and may each include a control circuit (e.g., a processor, a field-programmable gate array (FPGA), a logic gates circuit) and at least one attachment mechanism (e.g., an electromagnet) capable of generating a magnetic field with adjustable strength and/or polarity. It may be noted that the attachment mechanisms illustrated in FIGS. 7 to 12 are only for demonstration purposes and not intended to be limiting.

Figure 7:
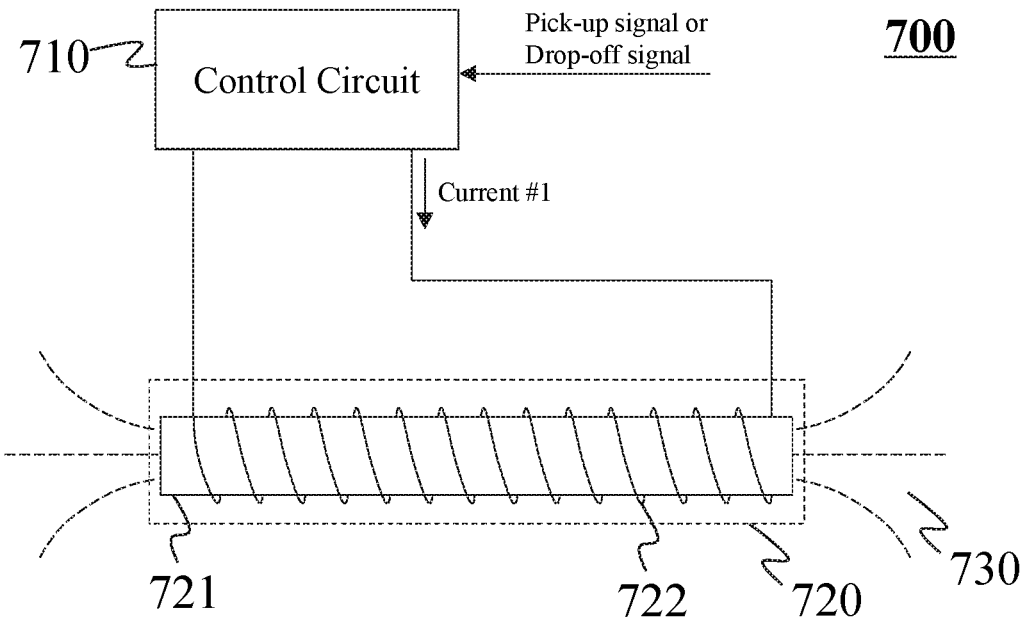
FIGS. 7 to 12 are schematic diagrams illustrating exemplary attachment modules according to some embodiments of the present disclosure.

As shown in FIG. 7, the attachment module 700 may include a control circuit 710 and an attachment mechanism 720. The attachment mechanism 720 may be an electromagnet in the art. For example, the attachment mechanism 720 may include a core 721 and a coil 722. The core 721 may include ferromagnetic substance. The coil 722 may include a plurality of loops around the core 721. The control circuit 710 may provide an electric current #1 to the attachment mechanism 720. The current #1 may pass through the attachment mechanism 720 (e.g., the coil 722), causing the attachment mechanism 720 to produce a magnetic field 730. It may be noted that a shape of the core 721 and a number of the loops may be arbitrary and are not limited by FIG. 7. The attachment mechanism 720 and other attachment mechanisms described in the present disclosure may also take any other proper form for generating a magnetic field (e.g., the magnetic field 730). For example, the core 721 may be "I"-shaped, "Y"-shaped, "O"-shaped, "U"-shaped, etc.

The control circuit 710 may control the magnetic field 730 (e.g., strength and/or polarity) by adjusting the current #1 in response to the pick-up signal or the drop-off signal (or the absence of the pick-signal over a predetermined time). For example, to reduce or increase the strength of the magnetic field 730, the control signal may increase or reduce the current #1. To reverse the polarity of the magnetic field 730, the control circuit 710 may reverse the direction of the current #1. Alternatively or additionally, the control circuit 710 may also turn on or turn off the current #1 to turn on or turn off the magnetic field 730. Turning on the magnetic field 730 may increase the strength of the magnetic field 730, and turning off the magnetic field 730 may reduce the strength of the magnetic field 730.

In some embodiments, the control circuit 710 may adjust the current #1 according to a function or a look-up table (e.g., with respect to time) to enhance a picking-up and/or attaching experience of the user or to secure the mobile device 120 from being accidentally damaged. For example, the control circuit 710 may reduce the current #1 slowly or smoothly to give the user enough time to hold the mobile device 120. As another example, the control circuit 710 may adjust the current #1 in a range that the user may have a good feel when picks up or attaches the mobile device 120 while the mobile device 120 may be tightly attached to the surface 130 without a concern of an accidental collision. As a further example, the control circuit 710 may adjust the current #1 in a manner that the user may have a force feedback when picks up or attaches the mobile device 120.

Figure 8:
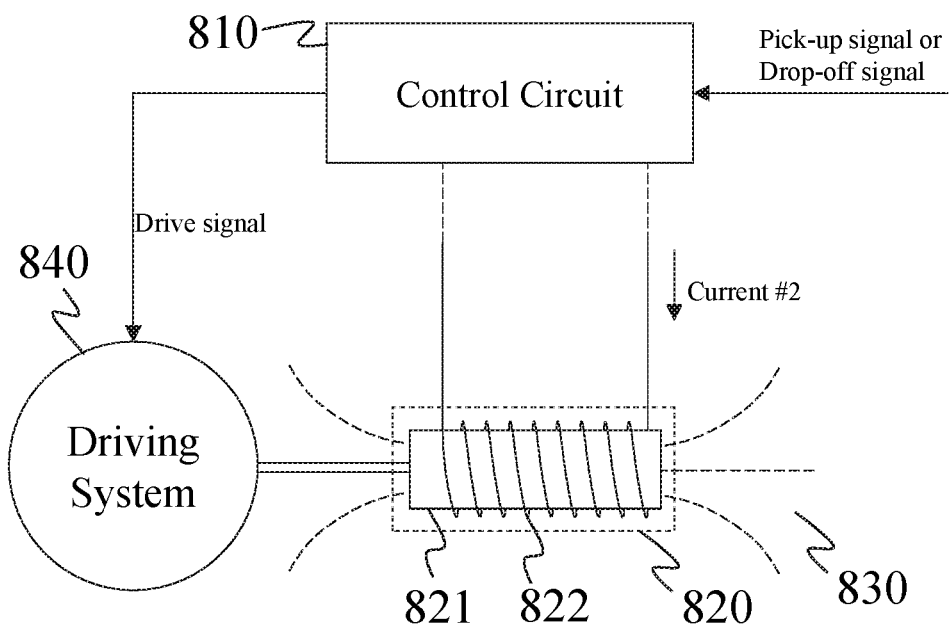

FIG. 8 illustrates another exemplary attachment module. The attachment module 800 may include a control circuit 810 and an attachment mechanism 820. The attachment mechanism 820 may be the same as or similar to the attachment mechanism 720, and may also include a core 821 and a coil 822. The core 821 may be movable. A current #2 passing through the attachment mechanism 820 (e.g., the coil 822) may cause the attachment mechanism 820 to generate a magnetic field 830. The attachment module 800 may further include a driving system 840. The driving system 840 may cause the core 821 to move with respect to the coil 822, so that a number of loops of the coil 822 around the core 821 may be changed, and the magnetic field 830 generated by the attachment mechanism 820 may also be changed correspondingly.

For example, the control circuit 810 may generate a first drive signal in response to the pick-up signal and generate a second drive signal in response to the drop-off signal (or the absence of a pick-signal over a predetermined time period). The first drive signal or the second drive signal may be transmitted to the driving system 840, causing the number of loops of the coil 822 around the core 821 to be decreased or increased. Consequently, the strength of the magnetic field 830 may be reduced or increased correspondingly.

In some embodiments, the control circuit 810 may also adjust the current #2 to further change the strength and/or polarity of the magnetic field 830 in a manner similar to the control circuit 710 adjusting the current #1. Alternatively, the control circuit 810 may not adjust the current #2.

Figure 9:
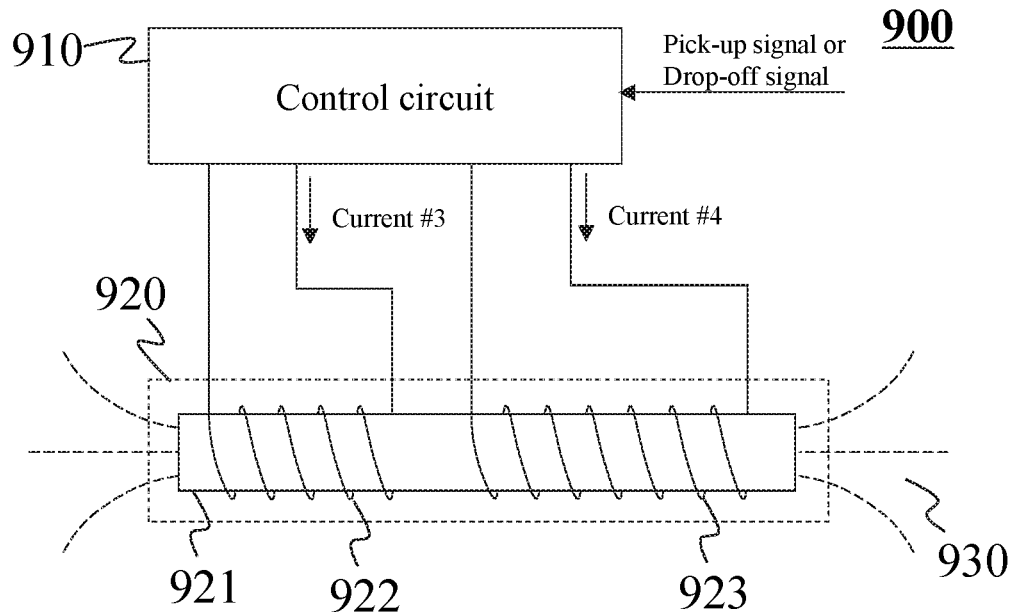

FIG. 9 illustrates another exemplary attachment module. The attachment module 900 may include a control circuit 910 and an attachment mechanism 920. The attachment mechanism 920 may include a core 921, a coil 922, and a coil 923. The coil 922 and the coil 923 may both include loops around the core 921. A number of loops of the coil 922 and a number of loops of the coil 923 may be the same or different. A current #3 may pass through the coil 922, and a current #4 may pass through the coil 923. The current #3 and the current #4 may both cause the attachment mechanism 920 to generate a magnetic field 930.

The control circuit 910 may control the magnetic field 930 by adjusting the current #3 and/or the current #4 in response to the pick-up signal or the drop-off signal. For example, the control circuit 910 may turn on or turn off the current #3 and/or the current #4 to increase or reduce the strength of the magnetic field 930. As another example, the control circuit 910 may increase or reduce the current #3 and/or the current #4 to increase or reduce the strength of the magnetic field 930. As a further example, the control circuit 910 may reverse the direction of the current #3 and/or the current #4 to reduce the strength of the magnetic field 930 or to reverse the polarity of the magnetic field 930.

In some embodiments, the control circuit 910 may only adjust, for example, the current #3 to change the strength of the magnetic field 930.

In some embodiments, the attachment mechanism 920 may include one or more additional coils. The control circuit 910 may further adjust the current(s) passing through the one or more additional coils to change the strength of the magnetic field 930 and/or reverse the polarity of the magnetic field 930.

Figure 10:
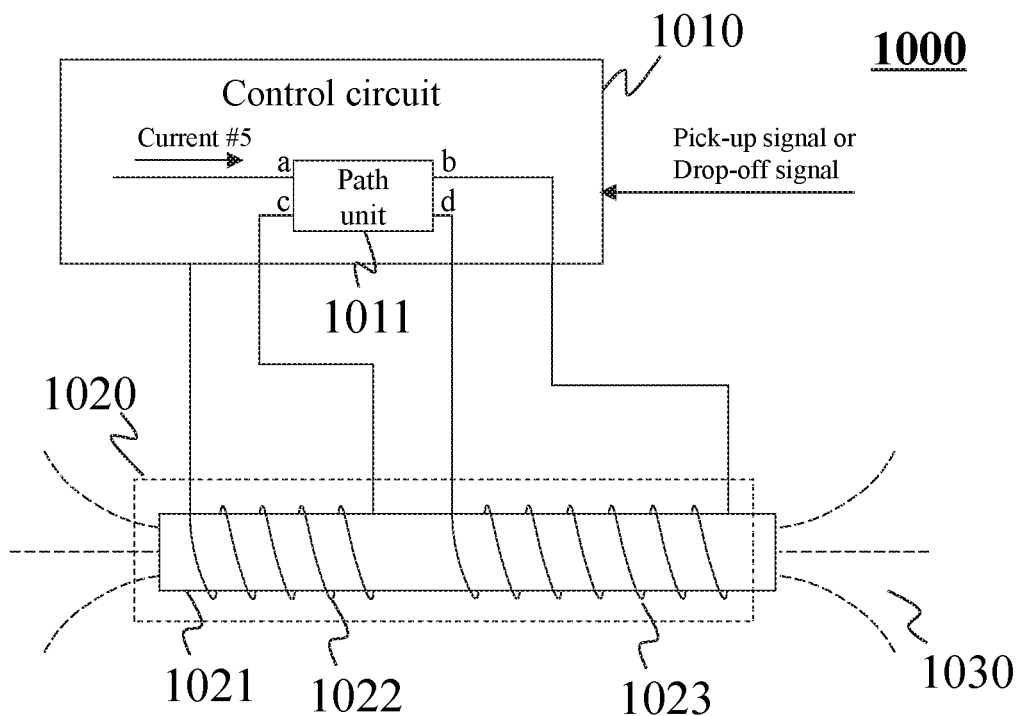

FIG. 10 illustrates another exemplary attachment module. The attachment module 1000 may include a control circuit 1010 and an attachment mechanism 1020. The attachment mechanism 1020 may include a core 1021, a coil 1022, and a coil 1023. The coil 1022 and the coil 1023 may both include loops around the core 1021. A number of loops of the coil 1022 and a number of loops of the coil 1023 may be the same or different. A current #5 may pass through the coil 1022 and/or the coil 1023, causing the attachment mechanism 1020 to generate a magnetic field 1030.

The control circuit 1010 may further include a path unit 1011. The path unit 1011 may change the transmitting path of the current #5 to control the number of the loops the current #5 passing through. For example, upon receiving the pick-up signal or the drop-off signal, the control circuit 1010 may transmit a control signal to the path unit 1011, causing the path unit 1011 to change the transmitting path of the current #5 so as to change the strength of the magnetic field 1030. The path unit 1011 may include one or more switches and/or transistors for changing the transmitting path of the current #5.

For example, to increase the strength of the magnetic field 1030, the path unit 1011 may cause the current #5 to be transmitted through an electric path formed between terminal a and terminal b of the path unit 1011 and an electric path formed between terminal c and terminal d of the path unit 1011. Consequently, the current #5 may pass through both the coil 1023 and the coil 1022.

As another example, to reduce the strength of the magnetic field 1030, the path unit 1011 may cause the current #5 to be transmitted through an electric path formed between terminal a and terminal c of the path unit 1011. Consequently, the current #5 may pass through the coil 1022 without passing through the coil 1023.

In some embodiments, the attachment mechanism 1020 may include one or more additional coils. The path unit 1011 and/or any other path unit of the control circuit 1010 may be involved in changing the transmitting path of the current #5.

In some embodiments, the control circuit 1010 may also adjust the current #5 to further change the strength and/or polarity of the magnetic field 1030 in a manner similar to the control circuit 710 adjusting the current #1. Alternatively, the control circuit 1010 may not adjust the current #5.

Figure 11:
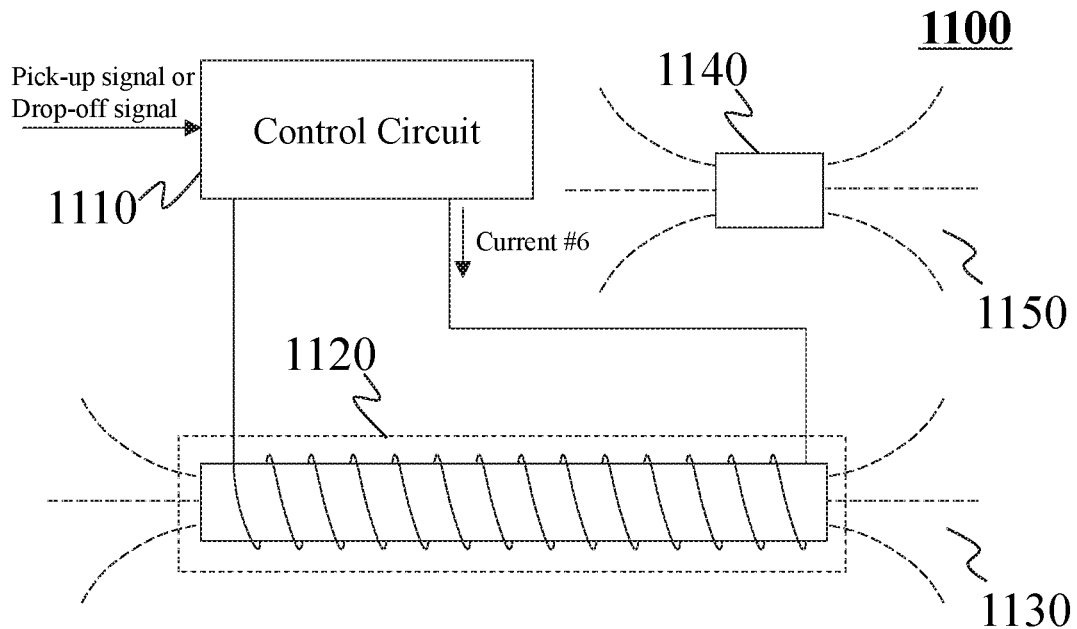

FIG. 11 illustrates another exemplary attachment module. The attachment module 1100 may include a control circuit 1110 and an attachment mechanism 1120. The attachment mechanism 1120 may be the same as or similar to the attachment mechanism 720. A current #6 passing through the attachment mechanism 1120 may cause the attachment mechanism 1120 to generate a first magnetic field 1130. The attachment module 1100 may further include a permanent magnet 1140. The permanent magnet 1140 may generate a second magnetic field 1150.

The second magnetic field 1150 may provide a basic strength for a combined magnetic field generated by the attachment module 1100. When the current #6 is turned off (e.g., to facilitate the user pick up the mobile device 120, by accident due to a power failure), the first magnetic field 1130 may be turned off, but the second magnetic field 1150 may still be generated by the permanent magnet 1140. In some embodiments, the strength of the second magnetic field 1150 may be the first intensity.

In some embodiments, the attachment module 1100 may include one or more additional permanent magnets 1140.

In response to the pick-up signal or the drop-off signal, the control circuit 1110 may adjust the current #6 to change the strength and/or polarity of the first magnetic field 1130 in a manner similar to the control circuit 710 adjusting the current #1. For example, the control circuit 1110 may turn on or turn off the current #6 to turn on or turn off the first magnetic field 1130 so as to increase or decrease the strength of the combined magnetic field generated by the attachment module 1100. As another example, the control circuit 1110 may reverse the direction of the current #6 to reverse the polarity of the first magnetic field 1130 so as to decrease the whole strength of the combined magnetic field generated by the attachment module 1100 or reverse the polarity of the combined magnetic field.

Figure 12:
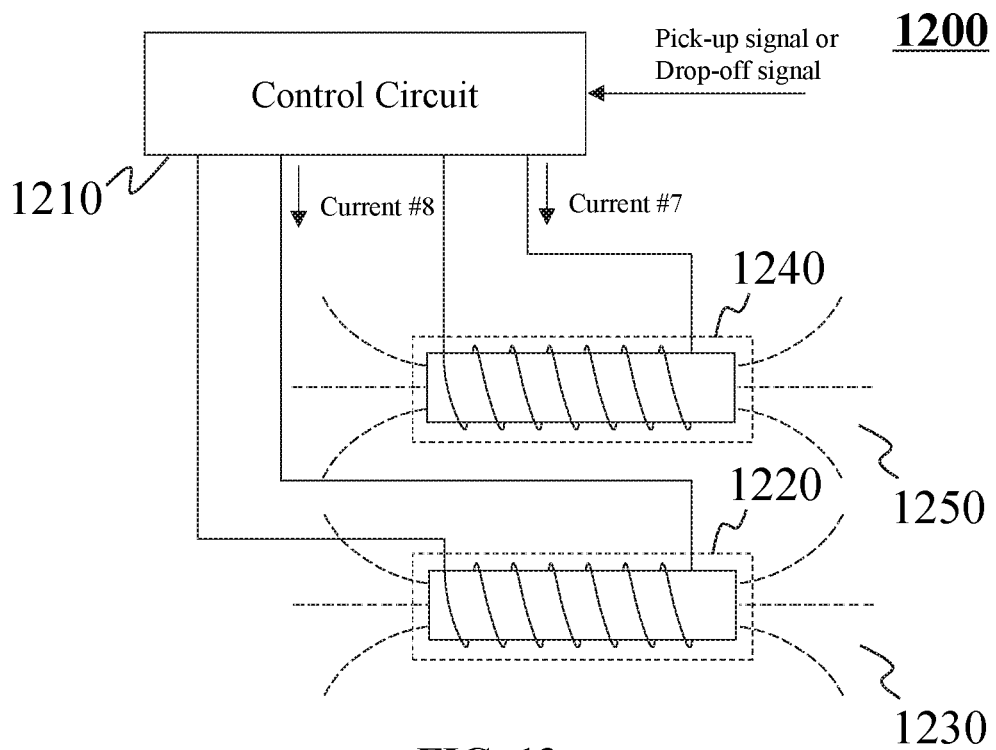

FIG. 12 illustrates another exemplary attachment module. The attachment module 1200 may include a control circuit 1210, a first attachment mechanism 1220, and a second attachment mechanism 1240. The first attachment mechanism 1220 and the second attachment mechanism 1240 may be the same as or similar to the attachment mechanism 720. A current #7 passing through the first attachment mechanism 1220 may cause the first attachment mechanism 1220 to generate a first magnetic field 1230. A current #8 passing through the second attachment mechanism 1240 may cause the second attachment mechanism 1240 to generate a second magnetic field 1250.

In response to the pick-up signal or the drop-off signal, the control circuit 1210 may adjust the current #7 to change a strength and/or a polarity of the first magnetic field 1130 (e.g., in a manner similar to the control circuit 710 adjusting the current #1). Alternatively or additionally, the control circuit 1210 may adjust the current #8 to change a strength and/or a polarity of the second magnetic field 1250. By changing the strength and/or the polarity of the first magnetic field 1230 and/or the strength and/or the polarity of the second magnetic field 1250, the attachment module 1200 may change a strength and/or a polarity of a combined magnetic field generated by the attachment module 1200.

In some embodiments, only one of the current #7 and current #8 may be adjusted, and the other one may be maintained, so that a basic strength may be provided for the combined magnetic field generated by the attachment module 1200. Alternatively, both of the current #7 and the current #8 may be adjusted.

In some embodiments, one or more additional attachment mechanisms may be included in the attachment module 1200. The control circuit 1210 may adjust the current(s) passing through the one or more additional attachment mechanism (e.g., in a manner similar to the control circuit 710 adjusting the current #1) to change a strength and/or a polarity of the combined magnetic field generated by the attachment module 1200.

It may be noted that concepts of the attachment modules 700 to 1200 may also be combined. For example, an exemplary embodiment of the attachment module 140 may include one or more permanent magnets (as illustrated in FIG. 11) and a plurality of attachment mechanisms (as illustrated in FIG. 12). As another example, an exemplary embodiment of the attachment module 140 may include a plurality of attachment mechanisms (e.g., as illustrated in FIG. 12), each of which may include a core and a plurality of coils around the core (e.g., as illustrated in FIG. 9 or FIG. 10). Any other proper combination, as well as any other form of the attachment mechanism, may also be adopted for implementing the attachment module 140.

FIGS. 13, 14, and 15 are schematic diagrams illustrating exemplary interactions between a first attachment module of a mobile device and a second attachment module of a host device according to some embodiments of the present disclosure. Mobile device 1310 and host device 1330 may be exemplary embodiments of the mobile device 120 and the host device 110, respectively. The mobile device 1310 may include a first attachment module 1320, which may be an exemplary embodiment of the attachment module 140. The host device 1330 may include a second attachment module 1340, which may also be an exemplary embodiment of the attachment module 140. The mobile device 1310 may also include a pick-up signal module (e.g., the pick-up signal module 124) and/or a drop-off signal module (e.g., the drop-off signal module 125) for generating a pick-up signal and/or a drop-off signal. It may be understood that, the pick-up signal module and/or the drop-off signal module may be included in the host device 1330 as well.

The first attachment module 1320 may generate a first magnetic field 1321 and the second attachment module 1340 may generate a second magnetic field 1341. A magnetic force may be formed via an interaction between the first magnetic field 1321 and the second magnetic field 1341. When the polarity of the first magnetic field 1321 is opposite to the second magnetic field 1341, an attractive magnetic force may be formed between the first attachment module 1320 and the second attachment module 1340 (e.g., as illustrated in FIG. 13), causing the mobile device 1310 to be magnetically attached to a surface 1331 of the host device 1330. In some embodiments, the polarity of one of the first magnetic field 1321 and the second magnetic field 1341 may be caused to be reversed, so that a repulsive magnetic force may be formed between the first attachment module 1320 and the second attachment module 1340 (e.g., as illustrated in FIG. 15), causing the mobile device 1310 to be easily picked up by the user.

When a pick-up signal or a drop-off signal is transmitted to the first attachment module 1320, a corresponding cooperation signal may also be transmitted to the second attachment module 1340. The cooperation signal may be the pick-up signal or the drop-off signal transmitted through a first communication module (e.g., the first communication module 123) included in the mobile device 1310 and a second communication module (e.g., the second communication module 112) included in the host device 1330. Alternatively, the cooperation signal may be a signal generated based on the pick-up signal or the drop-off signal by a circuit (e.g., a processor, an FPGA, a logic gates circuit) of the host device 1330. In response to the signals, at least one of the first attachment module 1320 and the second attachment module 1340 may change the strength and/or the polarity of the magnetic field. It may be understood that the pick-up signal or the drop-off signal may also be transmitted from the host device 1330 to the mobile device 1310, or the first attachment module 1320 may receive a cooperation signal generated based on the pick-up signal or the drop-off signal.

In some embodiments, both of the strengths of the first attachment module 1320 and the second attachment module 1340 may be reduced or increased by the first attachment module 1320 and the second attachment module 1340 in response to the pick-up signal/drop-off signal and the cooperation signal.

In some embodiments, one of the first attachment module 1320 and the second attachment module 1340 may be in charge of reducing or increasing the magnetic field, and the other one may be in charge of reversing the polarity of the magnetic field.

In some embodiments, one of the first attachment module 1320 and the second attachment module 1340 may smoothly reduce or increase the magnetic field, and the other one may reduce or increase the magnetic field by turning off or turning on the magnetic field. Alternatively, both of the first attachment module 1320 and the second attachment module 1340 may reduce or increase the magnetic field smoothly, or by turning off or turning on the magnetic field.

In some embodiments, at least one of the first attachment module 1320 and the second attachment module 1340 may include a permanent magnet to provide a base strength of the magnetic field.

In some embodiments, one of the first attachment module 1320 or the second attachment module 1340 may not respond to or receive the pick-up signal/drop-off signal or the corresponding cooperation signal. For example, the second attachment module 1340 may only be configured to provide the magnetic field 1341 to cooperate the magnetic field 1321 for generating an attractive or repulsive magnetic force.

In some embodiments, as illustrated in FIG. 14, a surface of the host device 1330 may include ferromagnetic substances. When the second attachment module 1340 turns off the magnetic field 1341, a basic magnetic force may still be formed via an interaction between the magnetic field 1321 and the surface 1331 no matter the polarity of the magnetic field 1321. A basic magnetic force may also be formed when the first attachment module 1340 turns off the magnetic field 1321, and a surface of the mobile device 1310 in contact with the surface 1331 includes ferromagnetic substances. Alternatively or additionally, the formation of the basic magnetic force may also involve any ferromagnetic substance near the surface 1331 (including the one of the first attachment module 1320 or the second attachment module 1340 as well). The changing of the strength and/or polarity of the magnetic fields 1321 and 1341 and/or the setting of the first intensity and/or the second intensity may also be based on the basic magnetic force between the mobile device 1310 and the host device 1330.

FIG. 16 is a schematic diagram illustrating an exemplary mobile device according to some embodiments of the present disclosure. Mobile device 1600 may be an exemplary embodiment of the mobile device 120. Mobile device 1600 may be configured to provide a control mechanism for a user to operate a host device (e.g., the host device 110). The mobile device 1600 may include a control panel 1610, an attachment module 1620, a first communication module 1630, a sensor module 1640, a processor 1650, a memory 1660 and storage 1670.

The control panel 1610 may be operative to the user for controlling the mobile device and/or the host device. The control panel 1610 may include a screen 1611 and/or a keypad 1612. The screen 1611 and the keypad 1612 may be the same as or similar to the screen 121 and the keypad 122 illustrated in FIG. 1, respectively, description of which are not repeated here.

The attachment module 1620 may be an exemplary embodiment of the attachment module 140. Through the attachment module 1620, the mobile device 1600 may be magnetically attached to the surface 130 of the host device 110. The attachment module 1620 may be implemented by the exemplary attachment modules illustrated in FIG. 7 to 12 or any other proper structures.

The mobile device 1600 may also include a first communication module 1630 to communicate with the host device 110 via, for example, one or more cables and/or the network 150. The first communication module 1630 may be an exemplary embodiment of the first communication module 123. In some embodiments, the first communication module 1630 may use WI-FI technique and/or Bluetooth™ technique to communicate with the host device 110.

The sensor module 1640 may include one or more sensors 1641. The one or more sensors 1641 may include at least one of a range sensor (e.g., a diastimeter, a rangefinder), an image sensor (e.g., a camera), a sound sensor (e.g., a microphone), a pressure sensor, or the like, or a combination thereof. The sensor module 1640 may transmit sensing signals through the one or more sensor 1641.

The mobile device 1600 may also include a processor 1650, a memory 1660, and storage 1670. In some embodiments, any other suitable component, including but not limited to a system bus or a controller (not shown), may also be included in the mobile device 1600. In some embodiments, instructions 1662 may be loaded into the memory 1660 from the storage 1670 in order to be executed by the processor 1650.

The control panel 1610 and the processor 1650 may implement the control mechanism for the user to operate the mobile device 1600 and/or the host device 110. Based on the user's operation on the control panel 1610, the processor 1650 may generate operation signals, which may be transmitted to the host device 110 through the first communication module 1630.

The sensor module 1640 and the processor 1650 may implement the pick-up signal module 124. When executing the instructions 1662, the processor 1650 may determine a first operation of the user to pick-up the mobile device 1600 from the surface 130 based on the sensing signals. When the first operation is determined, the processor 1650 may generate the pick-up signal, which may be transmitted to the attachment module 1620, causing the attachment module 1620 to perform at least one of reducing a strength of the magnetic field or reversing the polarity of the magnetic field In some embodiments, the sensor module 1640 and the processor 1650 may also implement the drop-off signal module 125. For example, instructions 1663 may be loaded into the memory 1660 from the storage 1670 in order to be executed by the processor 1650. When executing the instructions 1663, the processor 1650 may determine a second operation of the user to attach the mobile device 1600 to the surface 130 and/or a fact that the mobile device 1600 is near or in contact with the surface 130 based on the sensing signals, and generate a pick-up signal. When the second operation and/or the fact is determined, the processor 1650 may generate a drop-off signal, which may be transmitted to attachment module 1620, causing the attachment module 1620 to perform at least one of increasing a strength of the magnetic field or reversing a polarity of the magnetic field.

In some embodiments, the processor may also generate a pick-up and/or a drop-off signal to be transmitted to the host device 110.

In some embodiments, the mobile device 1600 may also include a charging connector (not shown in FIG. 16) receivable by a charging port on the host device 110 to be electrically connected to a power supply. When the mobile device 1600 is attaching to the surface 130, the charging connector may be in contact with the charging port.

FIGS. 17 to 22 are schematic diagrams illustrating exemplary manners for generating pick-up signals and/or drop-off signals through the mobile device illustrated in FIG. 16 according to some embodiments of the present disclosure. It may be understood that, FIGS. 17 to 22 are only for demonstration purposes and not intended to be limiting. The principles of FIGS. 17 to 22 may also be applied to mobile devices with other structures or to host devices that including the pick-up signal and/or drop-off signal generation mechanisms. In some embodiments, one or more manners illustrated in FIGS. 17 to 22 may be combined.

Figure 17:
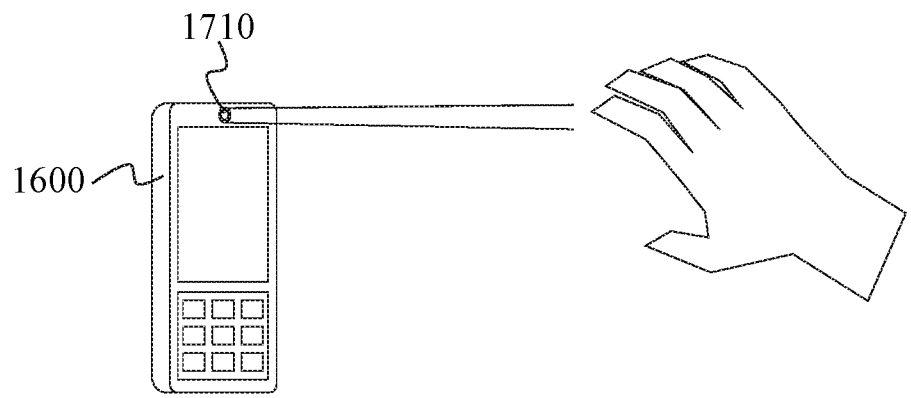

As shown FIG. 17, the one or more sensors 1641 of the mobile device 1600 may include a range sensor 1710. The range sensor 1710 may detect the distance between the user and the range sensor 1710. Alternatively or additionally, the range sensor 1710 may detect the presence of a user within the maximum detection range of the range sensor 1710. Based at least on a detected distance within a first predetermined scope or a detected user's presence (exemplary first operations), the processor 1650 may generate the pick-up signal. In some embodiments, based at least on the detected distance out of a second predetermined scope (same to or different from the first predetermined scope) or an absence of the user (exemplary second operations), the processor 1650 may generate the drop-off signal.

Figure 18:
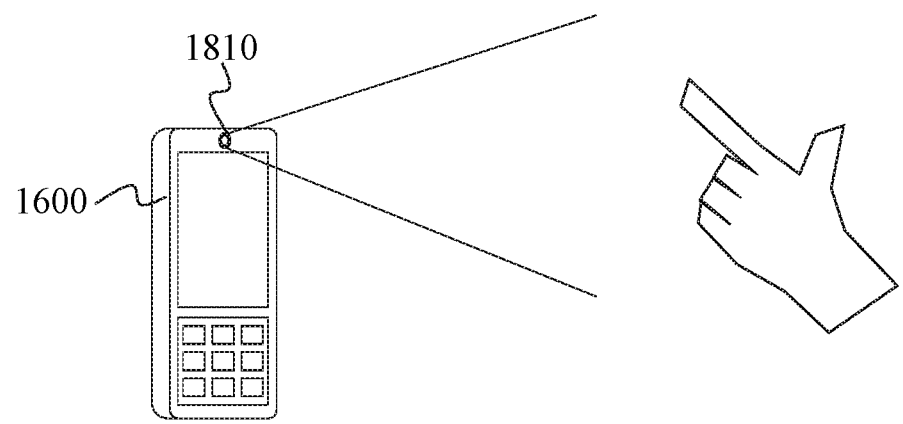
Figure 19:
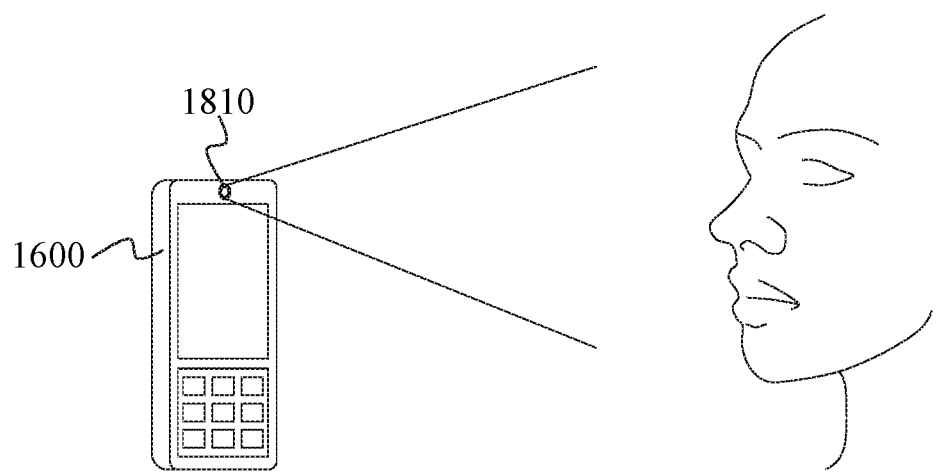

In FIGS. 18 and 19, the one or more sensors 1641 of the mobile device 1600 may include an image sensor 1810. The image sensor 1810 may generate an image of a detecting region. The processor 1650 may analyze the image to identify whether the user is to pick up or attach the mobile device 1600. For example, the processor 1650 may determine the distance or the presence of the user based on an image, and generate a pick-up signal or a drop-off signal based on the determination in a manner similar to the one described in connection with FIG. 17. As another example, the processor 1650 may determine whether a user is making a predetermined gesture or pose based on the image. In response to a determination that the user makes a gesture or pose matching with a template or model (e.g., pre-stored in a storage device such as the storage 1670 or the memory

1660) for picking up the mobile device 1600 (exemplary first operation), the processor 1650 may generate the pick-up signal. In some embodiments, in response to a determination that the user makes a gesture or pose matching with a template or model (e.g., pre-stored in a storage device such as the storage 1670 or the memory 1660) for attaching the mobile device 1600 (exemplary second operation), the processor 1650 may generate the drop-off signal.

In some embodiments, the processor 1650 may also perform a face recognition of the user based on the image to determine whether the user is authorized to pick-up the mobile device 1600 and generate the pick-up signal based on the recognition result. Alternatively or additionally, the face recognition may also be performed to allow the processor 1650 to determine whether a user is present in the image instead of other objects to prevent false triggering of the pick-up signal mechanism.

As shown FIG. 20, the one or more sensors 1641 of the mobile device 1600 may include a sound sensor 2010. The sound sensor 2010 may receive the user's voice and/or another type of sound. Based at least on a determination that the user makes voice or sound matching with a template or model (e.g., pre-stored in a storage device such as the storage 1670 or the memory 1660) for picking up the mobile device 1600 (exemplary first operation), the processor 1650 may generate the pick-up signal. In some embodiments, based at least on a determination that the user makes voice or sound matching with a template or model (e.g., pre-stored in a storage device such as the storage 1670 or the memory 1660) for attaching the mobile device 1600 (exemplary second operation), the processor 1650 may generate the drop-off signal.

In some embodiments, the processor 1650 may also determine whether a correct password is included in the voice or sound and/or whether the user is authorized to pick-up the mobile device 1600. The pick-up signal may be generated based further on the determination result.

As shown in FIG. 21, the user may pick up and/or drop off the mobile device 120 by operating on the control panel 1610. The processor 1650 may monitor the user's operation on the control panel 1610. For example, the user may press one or more buttons or keys on the keypad 1612 for picking up or attaching the mobile device 1600 (exemplary first operation and second operation). As another example, the user may operate on a UI provided on the mobile device 1600 through the screen 1611 and/or the keypad 1612 to pick up or attach the mobile device 1600 (exemplary first operation and second operation). In response to a determination that the operation of the user follows a protocol to pick-up the mobile device 1600, the processor 1650 may generate the pick-up signal. In some embodiments, in response to a determination that the operation of the user follows a protocol to drop-off the mobile device 1600, the processor 1650 may generate the drop-off signal.

In some embodiments, the processor 1650 may also determine whether a correct password is entered by the user during the operation to determine whether the user is authorized to pick-up the mobile device 1600 and generate the pick-up signal based on the determination result.

As shown in FIG. 22, the mobile device 1600 may provide one or more structures 2200 for the user to hold and/or pick up the mobile device 1600. The one or more structures 2200 may include one or more pressure sensors, which may be triggered when the user is holding and/or picking up the mobile device 1600 (exemplary first operation). When the one or more pressure sensors are trigged, the pick-up signal may be generated by the one or more pressure sensors or the processor 1650. In some embodiments, one or more other pick-up signal generating manners (e.g., as illustrated in FIGS. 17 to 21) may also be involved in the generation of the pick-up signal according to the manner illustrated in FIG. 22. In some embodiments, the one or more pressure sensors may also be trigged when the user is releasing the mobile device 1600 (exemplary second operation). The drop-off signal may then be generated by the one or more pressure sensors or the processor 1650. Optionally, one or more other drop-off signal generating manners (e.g., as illustrated in FIGS. 17 to 21) may also be involved in the generation of the drop-off signal according to the manner illustrated in FIG. 22.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting a predetermined operation that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A mobile device capable of being magnetically attached to a surface, comprising:
    a first attachment module, configured to generate a first magnetic field based on a first electric current, wherein:
        the first magnetic field is configured to form an attractive magnetic force to cause the mobile device to be magnetically attached to the surface;
        the first attachment module, in response to a pick-up signal corresponding to a detected first operation of a user to pick up the mobile device, performs at least one of reducing a strength of the first magnetic field by reducing the first electric current or reversing a polarity of the first magnetic field by reversing a direction of the first electric current, and in response to a drop-off signal corresponding to a detection that the mobile device is near or in contact with the surface, performs at least one of increasing the strength of the first magnetic field or reversing the polarity of the first magnetic field, wherein
        to reduce the strength of the first magnetic field, a control circuit is configured to change an electric path of the first electric current, or cut off the first electric current,
        the control circuit is further configured to adjust a second electric current passing through the first attachment module, and to reduce the strength of the first magnetic field, the control circuit is further configured to reduce the second electric current or cut off the second electric current; and
    a pick-up signal module, configured to generate the pick-up signal upon a detection of the first operation of the user, wherein the pick-up signal module comprises:
        a sensor, configured to sense a surrounding environment of the mobile device and generate a sensing signal corresponding to the surrounding environment of the mobile device; and
        a logical circuit, configured to detect the first operation of the user based on the sensing signals, and generate the pick-up signal when the first operation is detected.

2. The mobile device of claim 1, further comprising:
a second attachment module, configured to generate a second magnetic field, wherein the control circuit is further configured to adjust a third electric current passing through the second attachment module in response to the pick-up signal to cooperate with the adjustment of the first electric current.

3. The mobile device of claim 1, wherein the pick-up signal module comprises a touch mechanism, wherein
the touch mechanism is configured to generate the pick-up signal when the touch mechanism is touched by the user.

4. The mobile device of claim 1, wherein:
the first attachment module, in response to an absence of the pick-up signal after a predetermined time, performs at least one of increasing the strength of the first magnetic field or reversing the polarity of the first magnetic field.

5. The mobile device of claim 1, wherein:
the first attachment module, in response to a drop-off signal corresponding to a detected second operation of the user to attach the mobile device to the surface, performs at least one of increasing the strength of the first magnetic field or reversing the polarity of the first magnetic field.

6. The mobile device of claim 5, further comprising:
a drop-off signal module, configured to generate the drop-off signal upon a detection of the second operation or a detection that the mobile device is near or in contact with the surface.

7. An attachment system, comprising:
a host device, providing a surface for a mobile device to be magnetically attached to; and
the mobile device capable of being magnetically attached to the surface, comprising:
  a first attachment module, configured to generate a first magnetic field based on a first electric current, wherein:
    the first magnetic field is configured to form an attractive magnetic force to cause the mobile device to be magnetically attached to the surface;
    the first attachment module, in response to a pick-up signal corresponding to a detected first operation of a user to pick up the mobile device, performs at least one of reducing a strength of the first magnetic field by reducing the first electric current or reversing a polarity of the first magnetic field by reversing a direction of the first electric current, and in response to a drop-off signal corresponding to a detection that the mobile device is near or in contact with the surface, performs at least one of increasing the strength of the first magnetic field or reversing the polarity of the first magnetic field;
  a first communication module, configured to communicate with a second communication module of the host device;
  a control panel, configured to provide a control mechanism for the user to operate the host device; and
  a charging connector receivable by a charging port on the host device to be electrically connected to a power supply, and the charging connector being in contact with the charging port when the mobile device is attaching to the surface, wherein the host device comprises a second attachment module configured to generate a fourth magnetic field,
  the second attachment module, in response to a cooperation signal, performs at least one of reducing the strength of the fourth magnetic field or reversing the polarity of the fourth magnetic field; and
  the cooperation signal is the pick-up signal or generated based on the pick-up signal.

8. The attachment system of claim 7, wherein the host device comprises a permanent magnet configured to generate a third magnetic field, wherein the third magnetic field and the first magnetic field have opposite polarities when the mobile device is attached to the surface.

9. The attachment system of claim 7, wherein the fourth magnetic field and the first magnetic field have opposite polarities when the mobile device is attached to the surface.

10. The attachment system of claim 7, wherein the host device is a medical imaging device.

11. A method for facilitating a user to operate a mobile device capable of being magnetically attached to a surface, the method comprising:
generating a pick-up signal corresponding to a detected first operation of the user to pick up the mobile device magnetically attached to the surface;
receiving the pick-up signal by an attachment module that is configured to produce a magnetic field to form an attractive magnetic force to cause the mobile device to be magnetically attached to the surface, wherein the magnetic field is generated based on a first electric current;
reversing, by the attachment module in response to the pick-up signal, a polarity of the magnetic field to make the attractive magnetic force become a repulsive magnetic force;
performing, by the attachment module in response to an absence of the pick-up signal after a predetermined time, at least one of increasing the strength of the magnetic field or reversing the polarity of the magnetic field;
generating a drop-off signal corresponding to a detected second operation of the user to attach the mobile device to the surface or a detection that the mobile device is near or in contact with the surface;
receiving the drop-off signal by the attachment module; and
performing, by the attachment module, at least one of increasing the strength of the magnetic field or reversing the polarity of the magnetic field in response to the drop-off signal.

* * * * *